(12) United States Patent
Kodama et al.

(10) Patent No.: US 6,614,506 B2
(45) Date of Patent: Sep. 2, 2003

(54) IMAGE FORMING APPARATUS AND REGISTRATION CORRECTING METHOD OF THE IMAGE FORMING APPARATUS

(75) Inventors: Hirokazu Kodama, Shizuoka (JP); Tatsuhito Kataoka, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/866,603

(22) Filed: May 30, 2001

(65) Prior Publication Data

US 2002/0008859 A1 Jan. 24, 2002

(30) Foreign Application Priority Data

May 31, 2000 (JP) ........................ 2000-163199

(51) Int. Cl.7 ..................... G03B 27/32; B41J 2/385; G03G 15/16; G01B 11/00; H04N 1/23
(52) U.S. Cl. ..................... 355/32; 355/35; 355/40; 355/55; 347/116; 347/118; 347/187; 347/215; 399/297; 399/299; 399/372; 356/399; 356/400; 356/401; 358/300
(58) Field of Search ..................... 355/32, 35, 40, 355/55; 347/116, 118, 187, 215; 399/297, 299, 372; 356/399, 400, 401; 358/300

(56) References Cited

U.S. PATENT DOCUMENTS

| | | | |
|---|---|---|---|
| 5,631,686 A | * | 5/1997 | Castelli et al. |
| 5,909,235 A | * | 6/1999 | Folkins |
| 6,128,106 A | | 10/2000 | Watanabe et al. ........... 358/498 |
| 6,246,857 B1 | * | 6/2001 | Tanaka |
| 6,310,681 B1 | * | 10/2001 | Taniwaki |

* cited by examiner

Primary Examiner—Frank G. Font
Assistant Examiner—Khaled Brown
(74) Attorney, Agent, or Firm—Fitzpatrick, Cella, Harper & Scinto

(57) ABSTRACT

An image forming apparatus for sequentially superimposes images formed by a plurality of image forming stations for forming images of different colors, respectively, on a transferring material born and transported by a transferring material transporting member, which forms a misregister detection mark on the transferring material transporting member, illuminates to read the mark, calculates a misregister amount of the read misregister detection mark, and corrects the misregister of an image based on calculated results, wherein the apparatus adjusts an illuminating light amount according to a color of a misregister detection mark.

25 Claims, 18 Drawing Sheets

FIG. 16

RECORDING MEDIUM
SUCH AS FD/CD-ROM

| DIRECTORY INFORMATION |
|---|
| FIRST DATA PROCESSING PROGRAM PROGRAM CODE GROUP CORRESPONDING TO STEPS OF FLOWCHARTS AS SHOWN IN FIGS. 14 AND 15 |
|  |

MEMORY MAP OF RECORDING MEDIUM

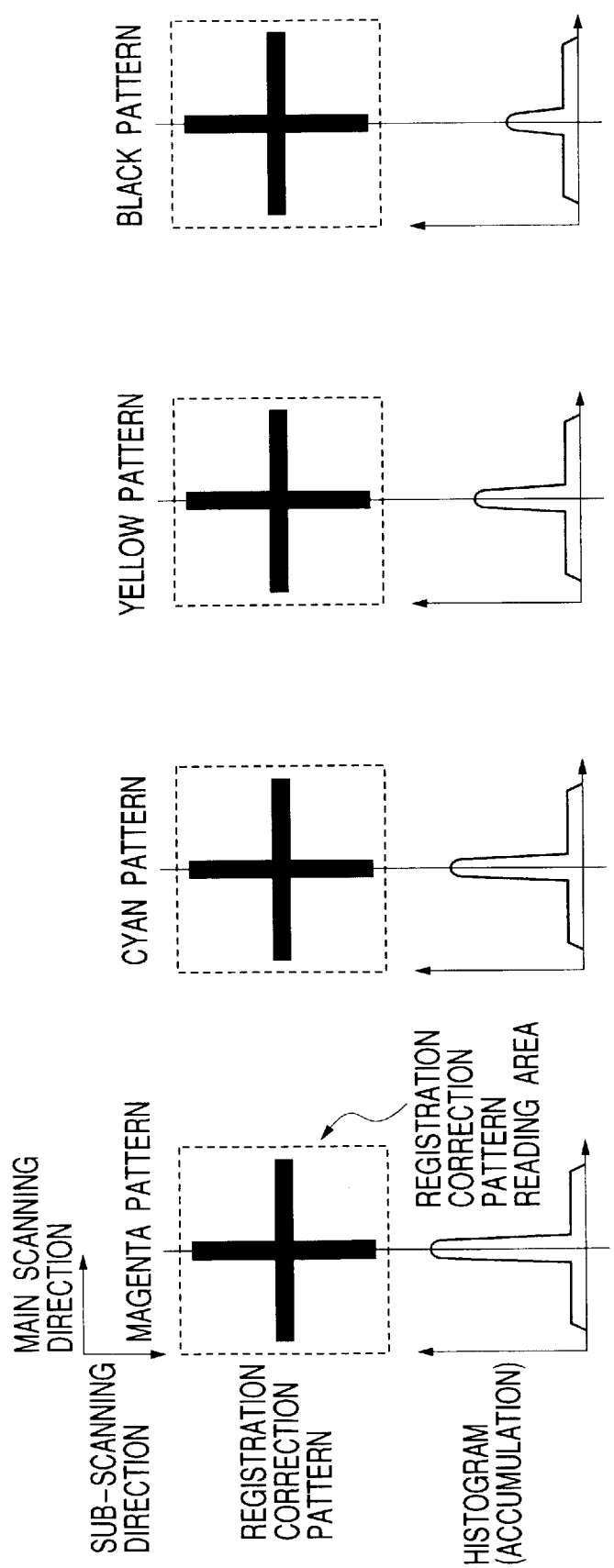

IMAGE FORMING APPARATUS AND REGISTRATION CORRECTING METHOD OF THE IMAGE FORMING APPARATUS

BACKGROUND OF THE INVENTION

1. Field of the Invention

The present invention relates to an image forming apparatus, which has a plurality of image forming stations for forming an image corresponding to different colors, respectively, on an image bearing member, and transfers the image formed at each image forming station on a transferring material transported by a transporting member to form an image, or an image forming apparatus for sequentially transferring an image formed at each image forming station on an intermediate transfer member and then transferring the image on a transferring material, and a registration correcting method of the image forming apparatus.

2. Related Background Art

Conventionally, an image forming apparatus has been proposed which has a plurality of image forming portions for irradiating a laser beam that is optically modulated according to recording information on a photosensitive drum, developing an electrostatic latent image of a drum by an electrophotographic process and transferring an image on a transferring material, and is capable of multiply transferring each color image on a transferring material while sequentially transporting the transferring material to each image forming portion by a transfer belt to form a color image. In addition, an image forming apparatus is also proposed which sequentially superimposes images, which are formed by a plurality of image forming portions, to form the images on an intermediate transfer member and then collectively transfers the images on a transferring material.

In a case of using an image forming apparatus of this type, a phenomenon in which registration of each color image does not match due to a mechanical attachment error of each photosensitive drum, an error of an optical length of each laser beam, a change in an optical path, or the like when an electrostatic latent image is formed on each photosensitive drum, and the electrostatic latent image is developed and transferred on a transferring material on a transfer belt. Thus, conventionally, a pattern image for registration correction formed on a transfer belt is read by a CCD sensor or the like from each photosensitive drum, misregister is detected on a photosensitive drum corresponding to each color, an image signal that should be recorded is electrically corrected, or a reflection mirror provided in an optical path of a laser beam is driven to change an optical length or to correct a change in an optical length.

However, when registration (misregister) correction is executed in an image forming apparatus of this type, a difference of a level of reading a registration correction pattern is caused due to a difference of an image forming density of the registration correction pattern (a mark for detecting a misregister) to be recorded by each recording apparatus, that is, a difference of a colorant to be developed and transferred or the like. Therefore, a difference of a level of detecting the registration correction pattern is caused. In general, it is known that toner of magenta (Ma), cyan (Cy), yellow (Ye) and black (Bk) has a magnitude of reflectance of infrared ray in the order of Ma>Cy>Ye>Bk by an influence of their colorant components. A difference of a detection level due to a difference of reflectance of each colorant will be described with reference to FIGS. 18A, 18B, 18C and 18D.

FIGS. 18A to 18D are views showing an example of an output characteristic for reading a registration correction pattern in an image forming apparatus of this type. An upper section of each view in FIGS. 18A to 18D shows a registration correction pattern in a cross shape in each colorant of Ma, Cy, Ye and Bk as an example of a registration correction pattern. A lower section of each view in FIGS. 18A to 18D shows a waveform of the registration correction pattern read by a CCD sensor and converted into a histogram by accumulating the read data in a sub-scanning direction.

As shown in FIGS. 18A to 18D, when reading of a registration correction pattern is executed, a histogram of each colorant shows a waveform having a different peak value and slope of the line.

A difference between each colorant cannot be determined unconditionally because it affects colorant components, optical length or the like. However, a difference of a level of detecting each registration correction pattern is caused due to the difference, and a colorant with a low detection level has a worse detection accuracy of a registration correction pattern compared with a colorant with a high detection level.

As a result, there is a problem in that it is difficult to perform an adjustment of high accuracy when an image signal that should be recorded is electrically corrected, and/or an optical length is changed or a change in an optical length is corrected by driving a reflecting mirror provided in an optical path of a laser beam according to a misregistration amount obtained by detecting a registration correction mark recorded by each image forming portion.

SUMMARY OF THE INVENTION

The present invention has been made in view of the above problems, and it is an object of the present invention to provide an image forming apparatus and a registration correction method of the image forming apparatus with which a detection level can be maintained constant to perform registration correction of high accuracy regardless of a color of a registration correction mark.

In order to attain the above-mentioned object, the present invention provides an image forming apparatus which includes a plurality of image forming means for forming images with different colors, respectively transporting means for bearing and transporting a transferring material, transferring means for sequentially transferring an image formed by each of image forming means, to the transferring material, mark forming means for controlling each of the image forming means in order to form a misregister detection mark and controlling the transferring means in order to transfer the misregister detection mark to the transporting means;

illuminating means for illuminating the misregister detection mark on the transporting means;

reading means for reading the misregister detection mark illuminated by the illuminating means;

correcting means for corrected misregister based on information from the reading means; and adjusting means for adjusting a light amount of the illuminating means based on colors of a plurality of misregister detection marks.

In another aspect of the present invention, an image forming apparatus includes a plurality of image forming means for forming images with different colors, respectively, and transferring means for sequentially transferring an image formed by each of image forming means, to an intermediate transfer member, wherein the image forming apparatus includes:

mark forming means for controlling each of the image forming means in order to form a misregister detection mark;

illuminating means for illuminating the misregister detection mark on the intermediate transfer member;

reading means for reading the misregister detection mark illuminated by the illuminating means;

correcting means for correcting a misregister based on information from the reading means; and adjusting means for adjusting a light amount of the illuminating means based on colors of a plurality of misregister detection marks to be read.

Moreover, in another aspect, of the present invention is directed to a method of correcting a misregister among a plurality of image forming means in an image forming apparatus sequentially superimposing images formed by the plurality of image forming means to form an image, wherein the method includes:

a mark forming step for controlling the plurality of image forming means in order to form a misregister detection mark;

an illuminating step for illuminating the misregister detection mark formed by each of the plurality of image forming means;

a reading step for reading the misregister detection mark illuminated by the illuminating step;

a correcting step for correcting a misregister based on information obtained in the reading step; and an adjusting step for adjusting a light amount of the illuminating means based on colors of a plurality of misregister detection marks to be read.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

In the accompanying drawings:

FIG. 16 illustrates a memory map of a storage medium storing various data processing programs that can be read by an image forming system to which the image forming apparatus in accordance with the present invention is applicable; FIGS. 18A, 18B, 18C and 18D illustrate examples of a registration correction pattern reading and outputting characteristic in an image forming apparatus of this type.

DESCRIPTION OF THE PREFERRED EMBODIMENTS

Figure 1:
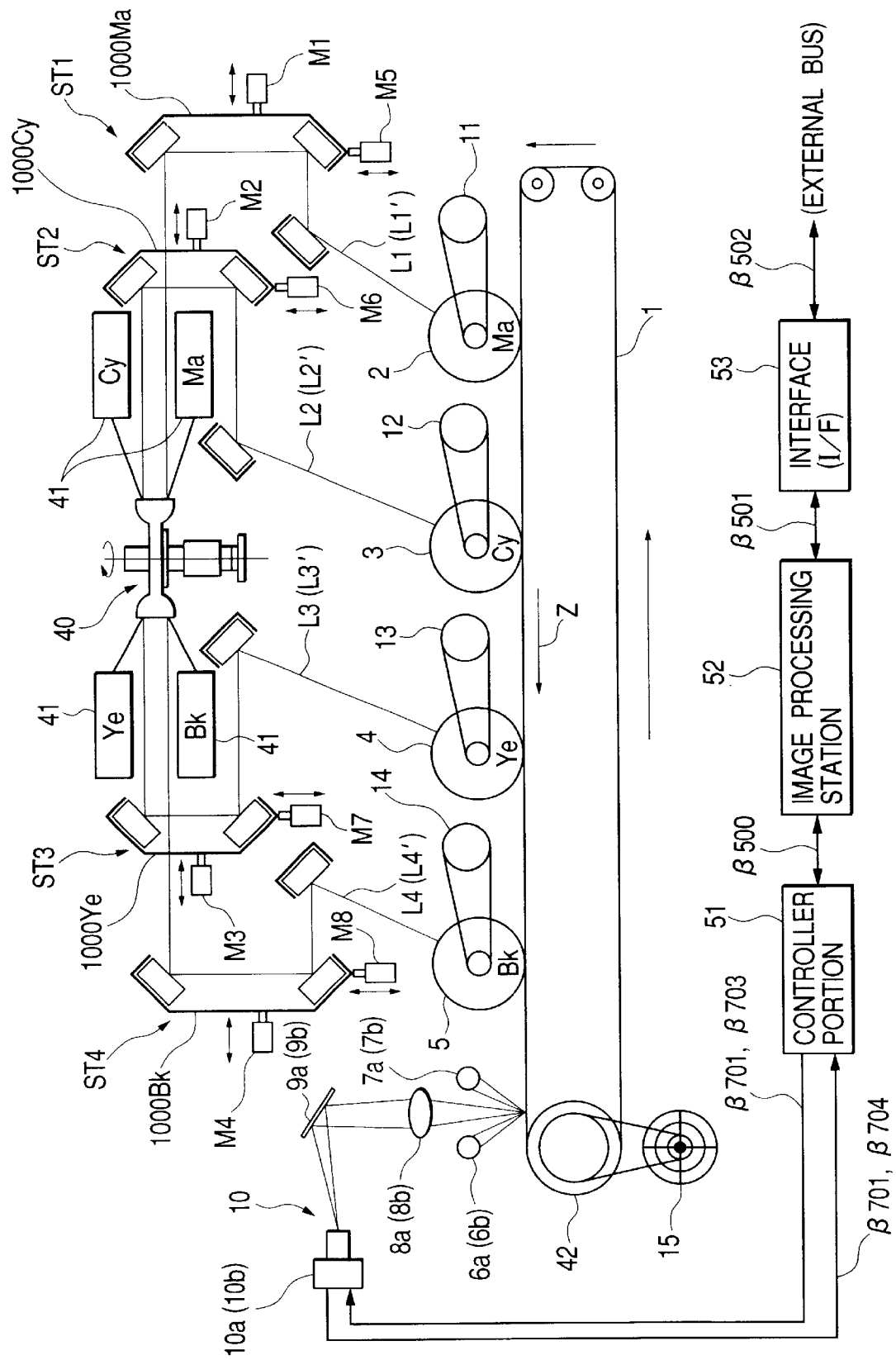
FIG. 1 is a schematic view illustrating configuration of main components of an image forming apparatus showing an embodiment of the present invention.
Figure 2:
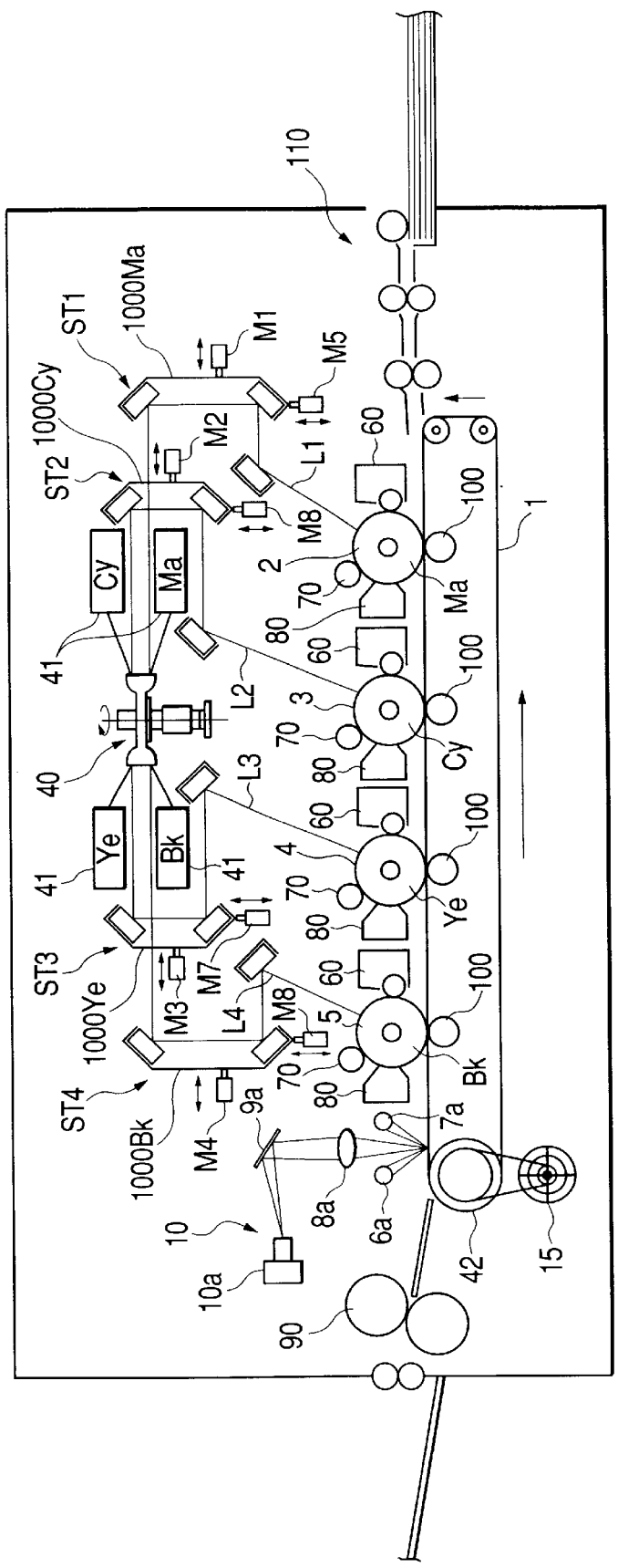
FIG. 2 is a view showing an overall configuration of the image forming apparatus of the embodiment of the present invention.

FIG. 1 is a schematic view illustrating configuration of main components of an image forming apparatus showing an embodiment of the present invention. FIG. 2 is a view showing an entire image forming apparatus. Image forming operations will be hereinafter described with reference to FIGS. 1 and 2.

Photosensitive drums 2, 3, 4 and 5 corresponding to magenta (Ma), cyan (Cy), yellow (Ye) and black (Bk) are rotated and driven by drum motors 11, 12, 13 and 14, respectively, and are uniformly charged by charging means 70. The photosensitive drums 2 to 5 corresponding to magenta (Ma), cyan (Cy), yellow (Ye) and black (Bk) are exposed to light by laser beams L1 and L1', laser beams L2 and L2', laser beams L3 and L3', and laser beams L4 and L4' which are optically modulated by a video signal. Then, electrostatic latent images of each color are formed on the photosensitive drums 2 to 5 driven by the drum motors 11 to 14, and are respectively developed by each developing means 60 having a developer (colorant) corresponding to each color to form visualized images.

The visualized images formed on the photosensitive drums 2 to 5 are respectively transferred on a transferring material, which is supplied from feed means 110 and electrostatically attracted to a transfer belt 1 being transferring material transporting means (a transporting member), by transferring means 100. The transferring material is then transported in the direction indicated by an arrow Z in FIG. 1 by a driving force of a pulse motor 15, subjected to a fixing process of fixing means 90 and delivered.

Reading means 10 is composed of illuminating systems (although LEDs are used in this embodiment, illuminating lamps such as halogen lamps can also realize the illuminating systems) 6a, 6b, 7a and 7b, condenser lenses 8a and 8b, reflecting mirrors 9a and 9b, sensors 10a and 10b consisting of CCDs, and the like. The reading means 10 reads patterns (e.g., a cross mark having a predetermined width, which is formed by a video controller 52a of an image processing station 52 in this embodiment) formed on the transfer belt 1 moved via a driving roller 42 in accordance with the driving force of the pulse motor 15 by imaging a light reflected back from the illuminated pattern onto the sensors 10a and 10b.

Then, a controller portion 51 applies a predetermined calculation processing to pattern image signals β702 and β704 read by the reading means 10 and stores results of the processing in storing means (RAMs 603 and 604 described later). Correcting means (a CPU 52c of the image processing station 52 in this embodiment) analyzes the stored calculation results and mechanically or electrically corrects each image station (ST1, ST2, ST3 and ST4) for each color. In this embodiment, positions of reflecting mirrors 100Ma, 100Cy, 1000Ye and 1000Bk of a scanning optical system (provided for each photosensitive drum) are driven by pulse motors M1, M2, M3, M4, M5, M6, M7 and M8 to mechanically correct deviations in a magnificence and a skew of registration. A timing for writing a registration correction pattern electrically corrects a scanning timing of a light beam by controlling the video controller 52a in the image processing station 52 described later or controlling a timing for reading out data of usual image data in a video memory 52b by a video memory controller 52d for a normal image data. Thus, registration between each photosensitive drum is made to be registered with each other.

The image processing station 52 and the controller portion 51 will be described in detail later.

In this embodiment, a two beam laser scan method is employed in a laser optical system in order to realize acceleration of an apparatus. This two beam laser scan will be described with reference to FIGS. 3A and 3B.

Figure 3A:
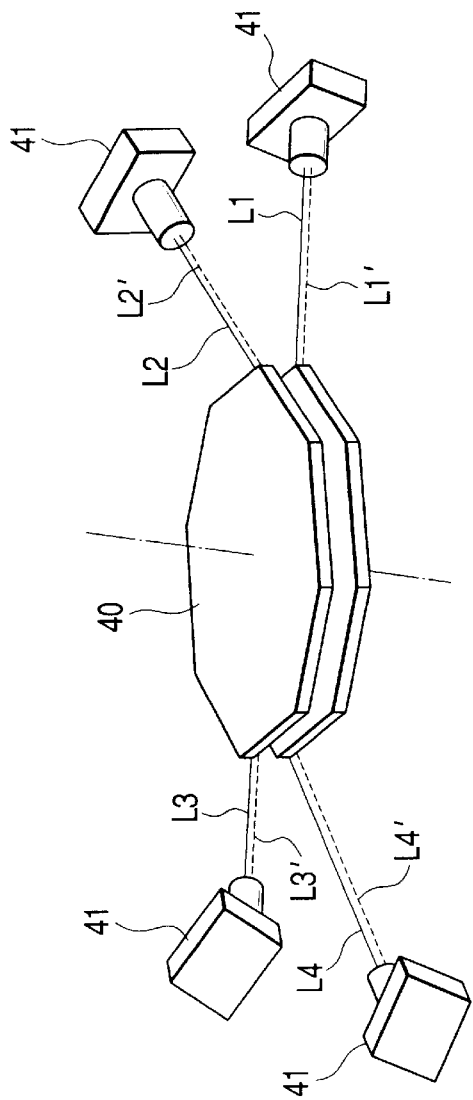
FIGS. 3A and 3B illustrate an association between parts of a polygon scanner and a laser driver and a scanning line formed by the polygon scanner.
Figure 3B:
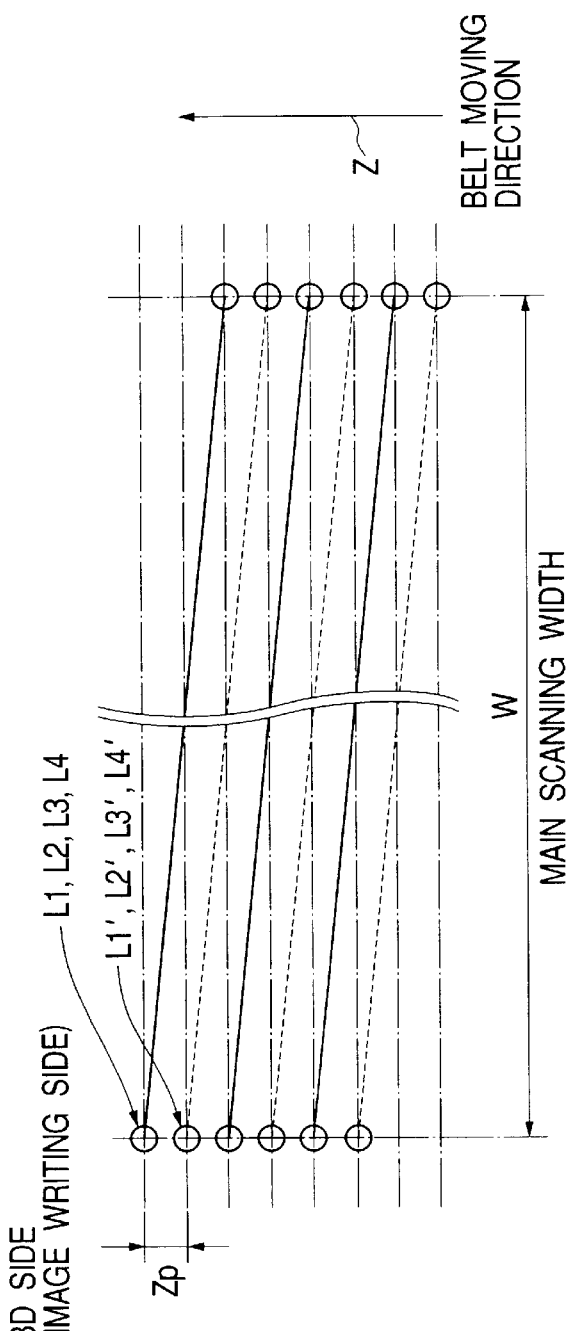

FIGS. 3A and 3B are views illustrating an association between parts of a polygon scanner 40 and a laser driver 41 of FIG. 1 and a scanning line formed by the polygon scanner. FIG. 3A corresponds to a configuration of a polygon scanner and laser driver part, for example to a case in which eight laser beams consisting of laser beams LM (L1), LC (L2), LY (L3), LBK (L4), LM' (L1'), LC' (L2'), LY' (L3') and LBK' (L4'), which corresponds to magenta (Ma), cyan (Cy), yellow (Ye) and black (Bk), are irradiated.

In this embodiment, a latent image of each color is formed on a photosensitive drum by two laser beams of each pair of L1 and L1', L2 and L2', L3 and L3' or L4 and L4'.

FIG. 3B corresponds to a description of a state in which laser is actually irradiated. A mark "○" in FIG. 3B represents one pixel by laser scanning. The laser beams L1 and L1', the laser beams L2 and L2', the laser beams L3 and L3', and the laser beams L4 and L4' are configured to be scanned in one line pitch Zp. With the employment of such a two beam laser scan method, even if a feeding speed of a transferring material (moving speed of a belt) is accelerated, a speed for forming an image on a transferring material or a belt may be half of the feeding speed. Thus, restrictions such as the number of rotations of a polygon scanner, a laser driving frequency and the like are significantly eliminated. For example, if the two beam laser scan method is employed in an image forming apparatus having an image forming capacity of thirty pieces per one minute, the capacity can be doubled to sixty pieces per one minute without improving the apparatus as a whole.

Figure 4:
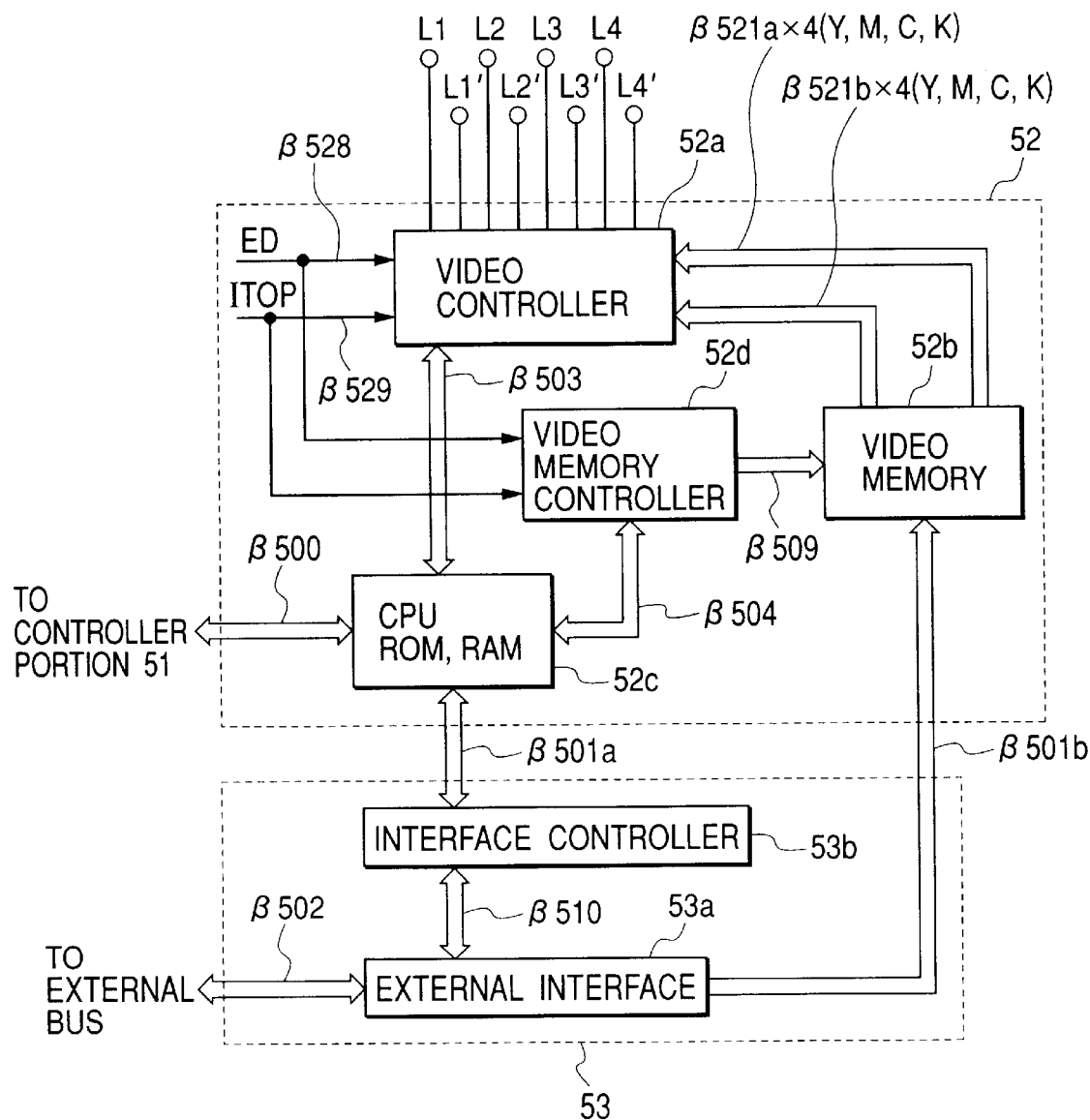
FIG. 4 is a block diagram illustrating a configuration of an image processing station.

FIG. 4 is a block diagram illustrating a configuration of the image processing station 52 shown in FIG. 1. The image processing station 52 and the interface (I/F) 53 for forming an image from image data inputted from an external bus β502 will be described.

In FIG. 4, a video signal for forming an image sent via the external bus β502 (a general purpose interface such as GPIB may be available as an external interface) and through an external interface 53a, and is stored in the video memory 52b by a video data bus β501b that is an interface with the image processing station 52. In storing the video signal, the CPU 52c drives an interface controller 53b by an interface bus β501a and performs interface control of the external interface 53a through a control bus β510.

In order to form an image, memory address control and writing/reading control of the video memory 52b are executed and transfer of video data is controlled via a video memory control bus β509 by the video memory controller 52d. Here, the video memory controller 52d is controlled by the CPU 52c via a control bus β504. The video memory 52b sends video signals β521a and β521b to the video controller 52a, forms the laser beams L1 and L1', the laser beams L2 and L2', the laser beams L3 and L3', and the laser beams L4 and L4', respectively, which are PWM modulated as described above, and forms latent images on each photosensitive drum.

Moreover, the video controller 52a is controlled by the CPU 52c via a video controller bus β503, and forms each pattern including a registration correction pattern that will be described later. Further, details of the video controller 52a will be discussed later. In addition, the CPU 52c is connected to the controller portion 51 via a CPU bus β500, receives misregister data and transfers electrical and mechanical registration correction target data to the controller portion 51, thereby collectively controlling registration correction of the present invention.

Forming and reading of a pattern image for registration correction (a mark for detecting a misregister) in an image forming apparatus of the present invention will be described in detail with reference to FIGS. 5A, 5B, 6, 7 and 8.

Figures 5A, 5B:
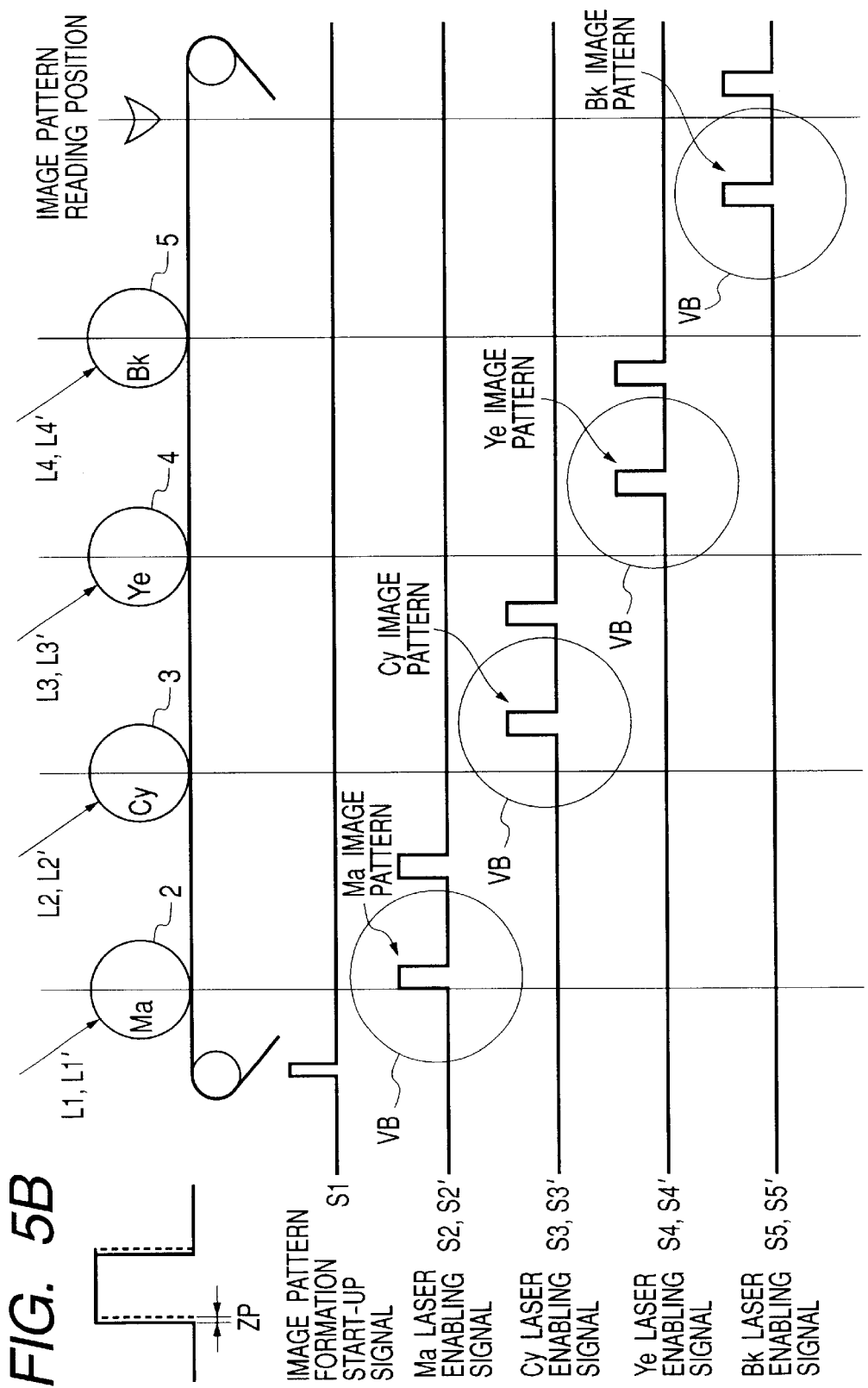
FIG. 5A is a timing chart showing a timing for forming an image of a pattern for registration correction in an image forming apparatus in accordance with the present invention.
FIG. 5B is an enlarged view of an encircled portion indicated by VB in FIG. 5A.
Figure 6:
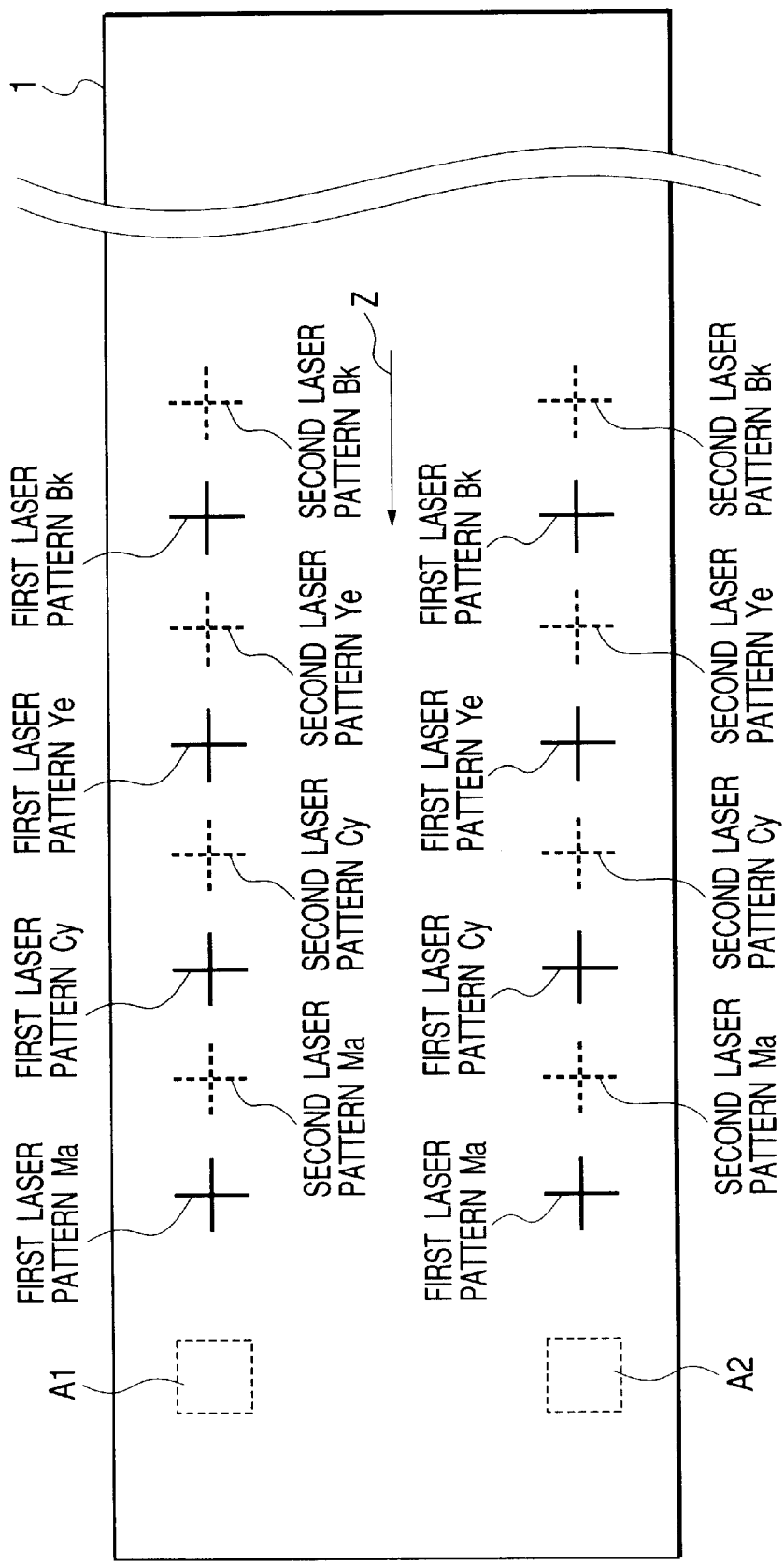
FIG. 6 illustrates a state of a registration correction pattern formed on a transfer belt.

FIG. 5A is a timing chart showing a timing for forming an image of a pattern for registration correction in an image forming apparatus in accordance with the present invention. FIG. 6 illustrates a state of a registration correction pattern formed on a transfer belt at the timing of FIG. 5A. Pattern images visualized on each photosensitive drums 2 to 5 at the timing shown in FIG. 5A by a pattern forming circuit in the video controller 52a, which will be described later, are transferred on the transfer belt 1, respectively, with an interval shown in FIG. 6. Then, the transported pattern images are read in image pattern reading areas A1 and A2 in the downstream in the transporting direction where the pattern reading means 10 consisting of the illuminating lamps 6a, 6b, 7a and 7b, the condenser lenses 8a and 8b, and the reflecting mirrors 9a and 9b is disposed.

Further, in FIG. 5A, a registration correction pattern enabling signal of each color is in the two beam laser scan method as described above. Therefore, as shown in FIG. 5B that is an enlarged view of an encircled portion indicated by VB of FIG. 5A, a width of enabling is identical for each color as S2 and S2', S3 and S3', S4 and S4', and S5 and S5', enabling signals having a one line pitch Zp can be outputted in two systems, and images of a registration correction pattern based on eight enabling signals in total (4×2) corresponding to each laser beam are formed, respectively, accordingly. In addition, similar enabling signals are formed in normal image forming operations.

Figure 7:
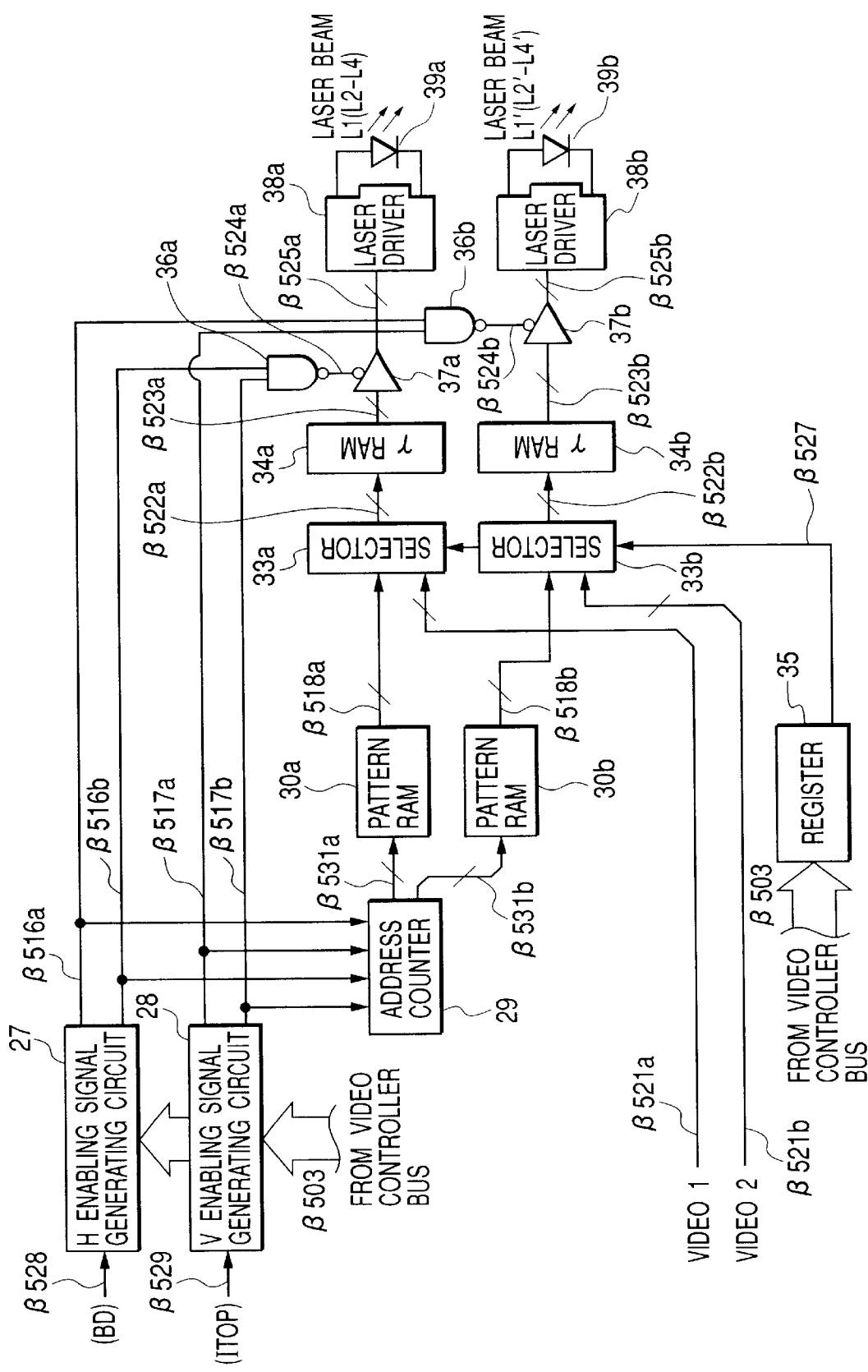
FIG. 7 is a circuit block diagram illustrating a configuration of a pattern forming portion.

FIG. 7 is a circuit block diagram illustrating a configuration of a pattern forming portion in the image forming apparatus of the video controller 52a in the image processing station 52 shown in FIG. 4.

In FIG. 7, a beam detect signal (BD) β528, which is obtained by scanning of a laser beam outside a recording region and becomes a synchronizing signal of a main scanning signal, is added in an enabling signal generating circuit (H enabling signal generating circuit) 27 in a main scanning direction. H direction enabling signals β516a and β516b of an image pattern signal for registration correction of two laser beams are then generated. At this point, the BD is not held in the two beams, respectively, but any one of the two beams or a synthesized signal of the two beams is used.

In addition, a start-up signal (ITOP) β529 for image pattern formation for registration correction is added to an enabling signal generating circuit (V enabling signal generating circuit) 28 in a sub-scanning direction. V direction enabling signals β517a and β517b of image pattern signals for registration correction of two laser beams of each color image pattern signals are then generated. The H direction enabling signals β516a and β516b and the V direction enabling signals β517a and β517b are supplied to an address counter 29, and generates address signals β531a and β531b of pattern RAMs 30a and 30b of an image for the next registration correction. Image pattern signals β518a and β518b are outputted from the pattern RAMs 30a and 30b in accordance with these address signals (a cross pattern in this embodiment).

In a mode for forming an image pattern, selectors 33a and 33b select an image pattern by a selection signal β527 from a register 35. Selected image information β522a and β522b is outputted from the selectors 33a and 33b to γRAMs 34a and 34b, and γ converted image information β522a and β522b are outputted as video signals (image signals) β525a and β525b to laser drivers 38a and 38b via gate circuits 37a and 37b. Gate signals β524a and β524b are inputted in the laser drivers 38a and 38b via NAND gates 36a and 36b. Semiconductor lasers 39a and 39b are ON/OFF modulated based on image signals β525a and β525b inputted in the laser drivers 38a and 38b, and latent images are formed on the photosensitive drums 2 to 5 via an optical scanning system such as a polygon scanner and a reflecting mirror.

As described above, since the laser driver has the two beam laser scan configuration, it has two systems for forming image data and patch data, which drive lasers, respectively.

Control of a position for starting to write an image of a registration correction pattern is performed by controlling main scan and sub-scan enabling signals via the CPU bus β500 by the CPU 52c. Control of a position for starting to write an normal image data is performed, based on data for calculating misregister amount of each color, by operating a video data address generating signal of the video memory controller 52d on the basis of the BD β528 and ITOP β529 signals via the video memory controller bus β503 from the CPU 52c and changing a timing for reading out video data from the video memory 52b via the video memory control bus β509.

Image data for four colors is inputted in the video memory 52b from the external interface 53a via the video data bus β501b and is saved in advance. The external interface 53a controls storage of data in the video memory 52b by the interface controller 53b via the control bus β510 that is controlled by the CPU 52c via the interface bus β501a.

Video data is read out from the video memory 52b at a timing for an image of each color to accurately register each other after a color registration is corrected, and is formed on a transferring material.

Further, although a pattern generating circuit is provided for each color in this embodiment, the pattern RAMs 30a and 30b or the like may be commonly used for each color.

Figure 8:
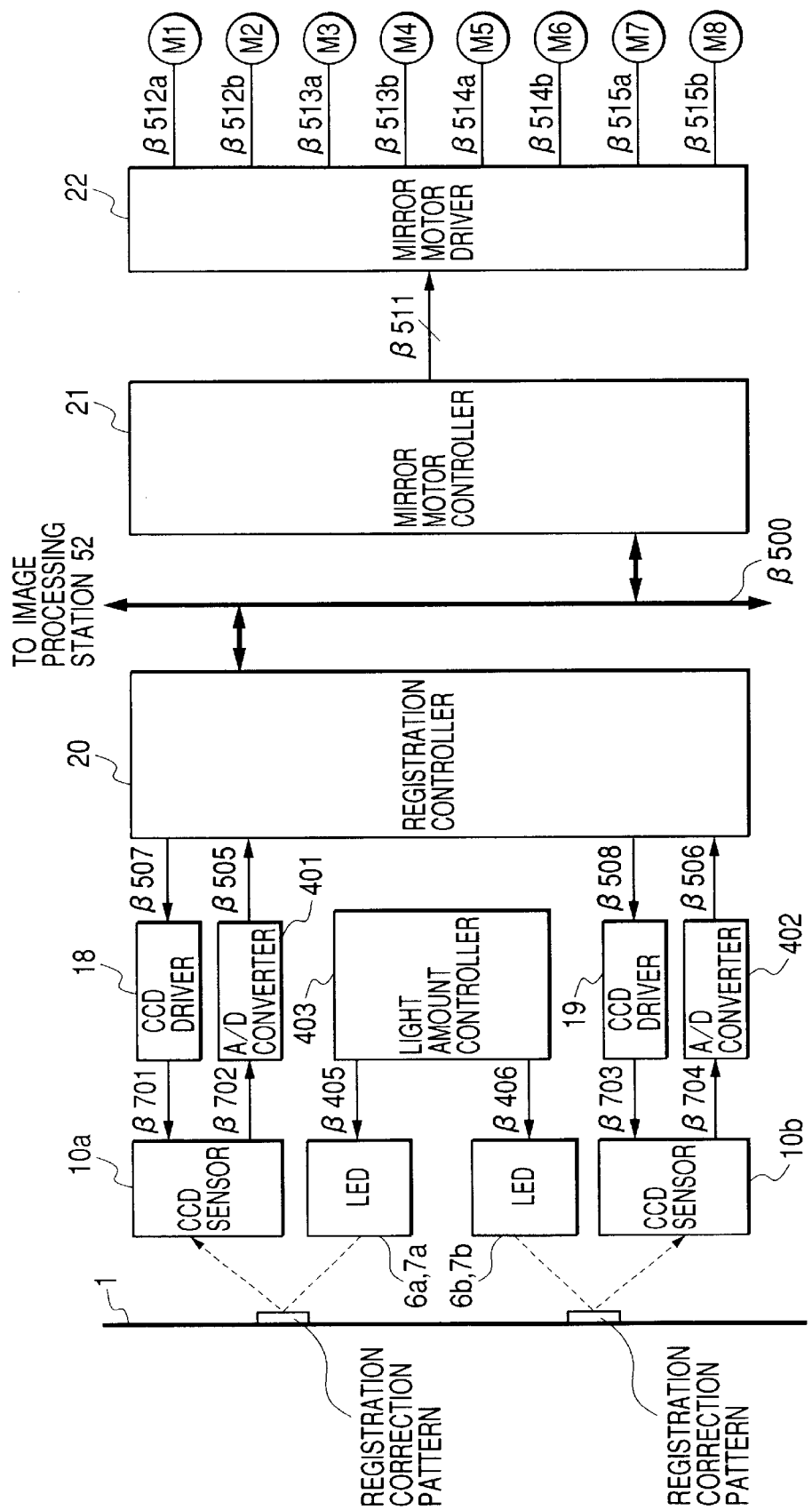
FIG. 8 is a block diagram illustrating a configuration of a read light amount controlling apparatus in the image forming apparatus in accordance with the present invention.

FIG. 8 is a block diagram illustrating a configuration of a reading light amount controlling apparatus in the image forming apparatus in accordance with the present invention, and corresponds to the detailed configuration of the controller portion 51 including a light amount controller 403, in which identical parts are denoted by reference numerals identical with those in FIG. 1.

In FIG. 8, light is irradiated on a pattern image of each color formed on the front side and the back side with respect to the transporting direction of the transfer belt 1 by the LEDs 6a, 6b, 7a and 7b whose light amounts are controlled by the light amount controller 403, which will be described later. The reflected light from each pattern image is then read by the CCD sensors 10a and 10b. Source clocks β507 and β508 are forwarded from a registration controller 20 to the CCD drivers 18 and 19, where clocks (transfer pulse, reset pulse, shift pulse or the like) β701 and β703 required for driving the CCD sensors 10a and 10b are generated and supplied to the CCD sensors 10a and 10b. Pattern image signals β702 and β704 read by the CCD sensors 10a and 10b are applied processing such as amplification, clamp, offset adjustment and A/D conversion by A/D converters 401 and 402, and forwarded to the registration controller 20 as digital signals β505 and β506.

Each color pattern image signal received by the registration controller 20 is applied pattern recognition processing for registration correction. Then, a plurality of pieces of recognition processing data is stored in a memory, and a deviation amount of each color registration is calculated from deviation amounts of patterns of other colors on the basis of a pattern image of a predetermined color by the CPU 52c via the CPU bus β500.

An electrical writing timing for each color main scanning and sub-scanning performs a misregister correction of each color by controlling the video controller 52a for a registration correction pattern or controlling a memory read-out timing of the video memory 52b by the video memory controller 52d for a normal image.

In addition, in order to change an optical length and correct a change in an optical length of a recording laser beam to correct a magnification of each color and a skew, each of the pulse motors M5, M6, M7 and M8 for skew correction and magnification correction pulse motors M1, M2, M3 and M4 for driving reflecting mirrors 100Ma, 100Cy, 1000Ye and 1000Bk provided in a light path, needs to be controlled. For this purpose, a driving pulse data is forwarded to the mirror motor controller 21 by the CPU 52c, a pulse motor driving pulse value is set in a mirror motor driver 22 by a motor driving control signal β511, and each motor is driven by driving pulses β512a, β512b, β513a, β513b, β514a, β514b, β515a and β515b. As a result, positioning control of the reflecting mirrors 1000Ma, 100Cy, 1000Ye and 1000Bk is performed.

Shape calculation processing of a registration correction pattern will be hereinafter described in detail with reference to FIGS. 9, 10 and 11.

Figure 9:
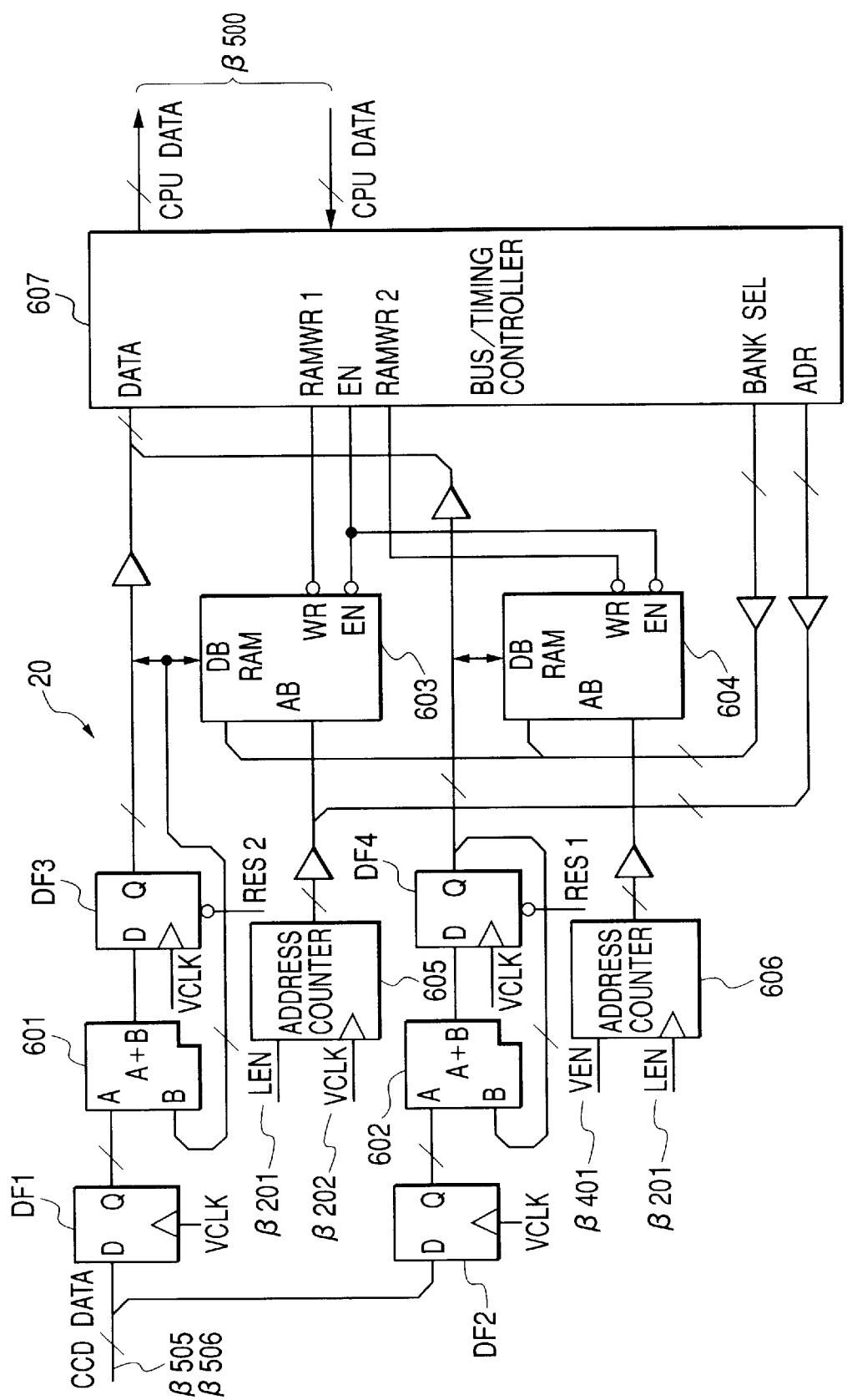
FIG. 9 is a block diagram illustrating an internal configuration of a registration controller.

FIG. 9 is a block diagram illustrating an internal configuration of the registration controller 20 shown in FIG. 8. FIG. 10 is a timing chart illustrating operations of the registration controller 20 shown in FIG. 9. FIG. 11 illustrates an example of accumulated data of main scanning/sub-scanning with respect to a pattern image stored in the RAMs 603 and 604 shown in FIG. 9.

In FIG. 9, it is assumed that an ITOP signal β529 outputted from the CPU 52c is inputted by the sub-scan enabling signal generating circuit 28 for reading a registration correction pattern, and an enabling signal (VEN) β401 in a sub-scanning direction synchronized with a main scan enabling signal (LEN) β201 for reading a registration correction pattern at a predetermined timing set in the CPU 52c by the CPU bus β500.

Reference numerals DF1, DF2, DF3 and DF4 denote flip-flops of D type. Reference numerals 601 and 602 denote adders, which perform operations on CCD image data β505 and β506 to be inputted in a port A and data to be inputted in a port B in synchronism with an image clock (VCLK) β202. Reference numeral 603 denotes an RAM, which stores a density histogram in a sub-scanning direction of a pattern of each color at a timing according to the timing chart shown in FIG. 10. Reference numeral 604 denotes an RAM, which stores a density histogram in a main scanning direction of a pattern of each color at a timing according to the timing chart shown in FIG. 10. Reference numeral 607 denotes a bus/timing controller, which outputs various timing signals and a bank selecting signal BANKSEL.

In the embodiment, accumulation data is prepared for each pixel in each line with respect to pattern data main scan and sub-scan read for calculating a pattern position and a pattern shape of each color, and a shape is recognized based on the prepared accumulation data.

Figure 10:
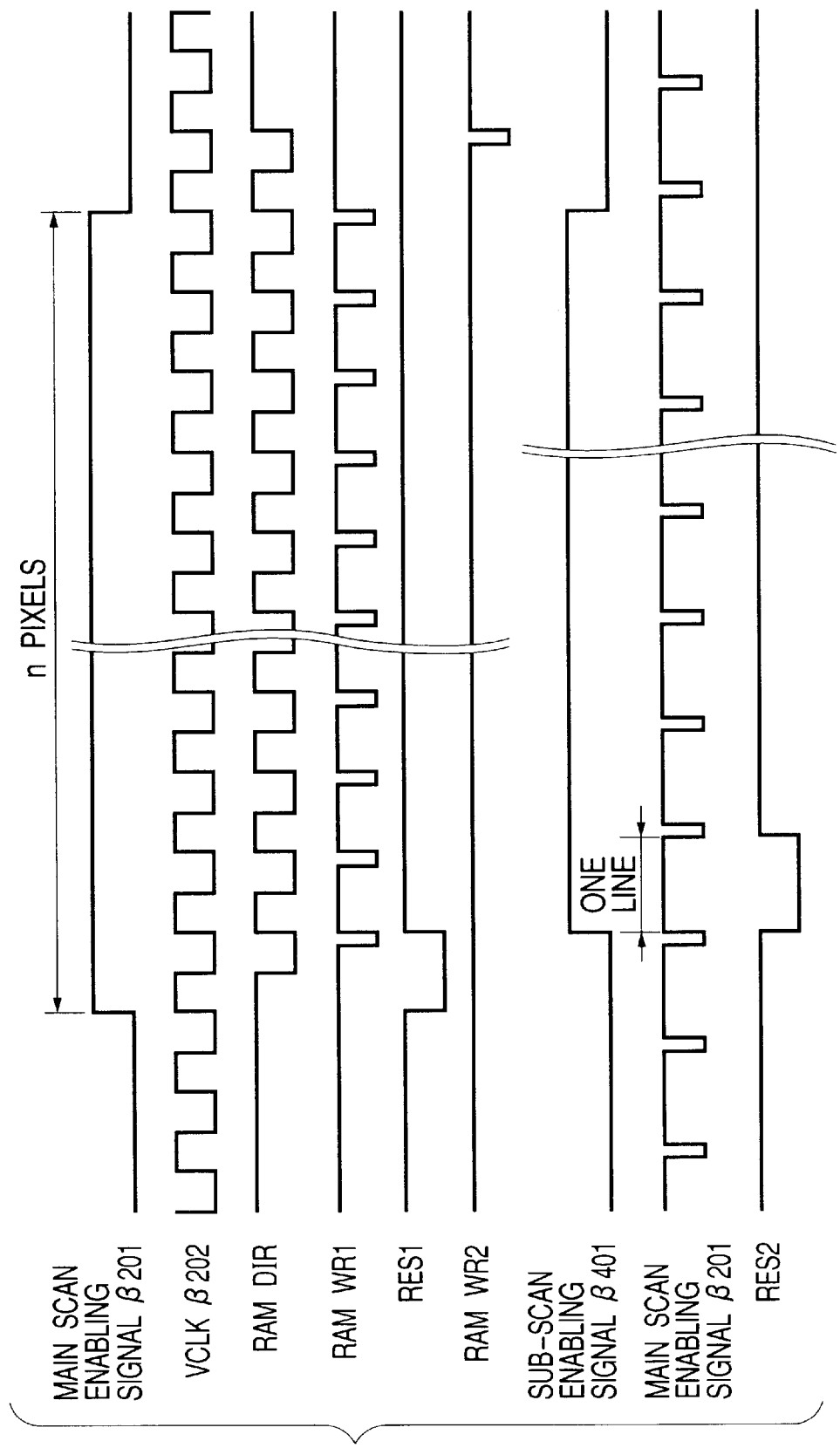
FIG. 10 is a timing chart illustrating operations of the registration controller shown in FIG. 8.

First, after initially clearing pattern data of one sub-scan line outputted, for example, from the CCD sensor 10a, data for one line is added by the adder 602 and accumulated data in a sub-scan direction is prepared, and the accumulated data is written in the RAM 604 in synchronism with a writing signal RAMWR2 in accordance with an address determined by an address counter 606 based on the main scan enabling signal LEN β201 outputted at the timing shown in FIG. 10.

Further, the address counter 606 and the RAM 604 are enabled while the sub-scanning direction enabling signal (VEN) β401 is forwarded.

On the other hand, accumulated data in a main scanning direction is stored in the RAM 603 after first clearing pattern data for a main scan one line by a reset signal RES2. Thereafter, reading, modifying and writing operations are repeated by writing signals RAMWR1 and RAMOE1 and a data direction switching signal RAMDIR in accordance with an address determined by an address counter 605 based on the image clock VCLK β202 inputted at the timing shown in FIG. 10. Accumulated data on each main scan line is stored in the RAM 603 for each pixel added in the adder 601.

Further, the address counter 605 is enabled while the main scan enabling signal (LEN) β201 is forwarded. The RAM 603 is enabled while the sub-scanning direction enabling signal (VEN) β401 is forwarded.

Figure 11:
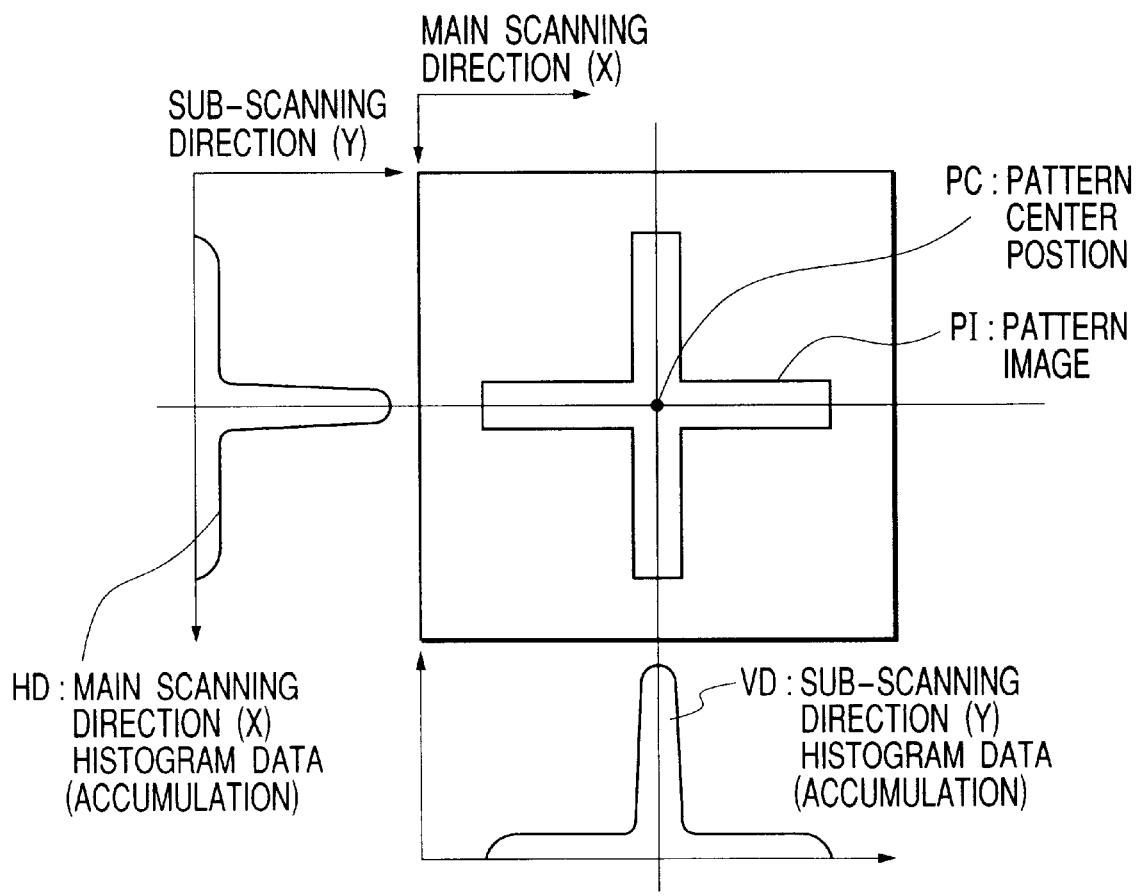
FIG. 11 illustrates an example of accumulated data of main scanning/sub-scanning with respect to a pattern image stored in an RAM.

As a result, accumulated data of main scan/sub-scan with respect to a pattern image shown in FIG. 11 is stored in the RAMs 603 and 604 for each color. Further, the above-mentioned processing circuit for pattern is configured such that it functions as two circuits in the registration controller 20, which are associated with the CCD sensors 10a and 10b.

A memory space is used appropriately by sending a bank of each color and a bank of each set to an upper hierarchy of an RAM address by the bank selection signal BANKSEL. As described before, pattern images of yellow (Ye), magenta (Ma), cyan (Cy) and black (Bk) obtain accumulated data HD and VD of main scan and sub-scan, respectively, as shown in FIG. 11 and is stored in the RAMs 603 and 604 (however, Bk has an inverted pattern of FIG. 10 because it is formed on a patch of Ye). A central position of a peak of accumulated data is calculated by the CPU 52c accessing the RAMs 603 and 604 based on the accumulated data HD and VD stored in the RAMs 603 and 604.

A central position of each color, where each color, main scan and sub-scan central positions calculated respectively are on a center of a pattern image, is corrected to be coincide with each other. This is attained by controlling each of writing positions of the above-mentioned main scan and sub-scan, and at the same time, driving the reflecting mirrors 1000Ma, 1000Cy, 1000Ye and 1000Bk by the motor driver 22 via the pulse motors M1 to M4 for magnification (optical length variable) correction, the pulse motor M5 to M7 for skew (optical path variable) correction and the mirror motor controller 21. Control of the motors is performed by the CPU 52c via the CPU bus β500.

Registration correction of the present invention will now be described in detail with reference to FIGS. 12 and 13.

Figure 12:
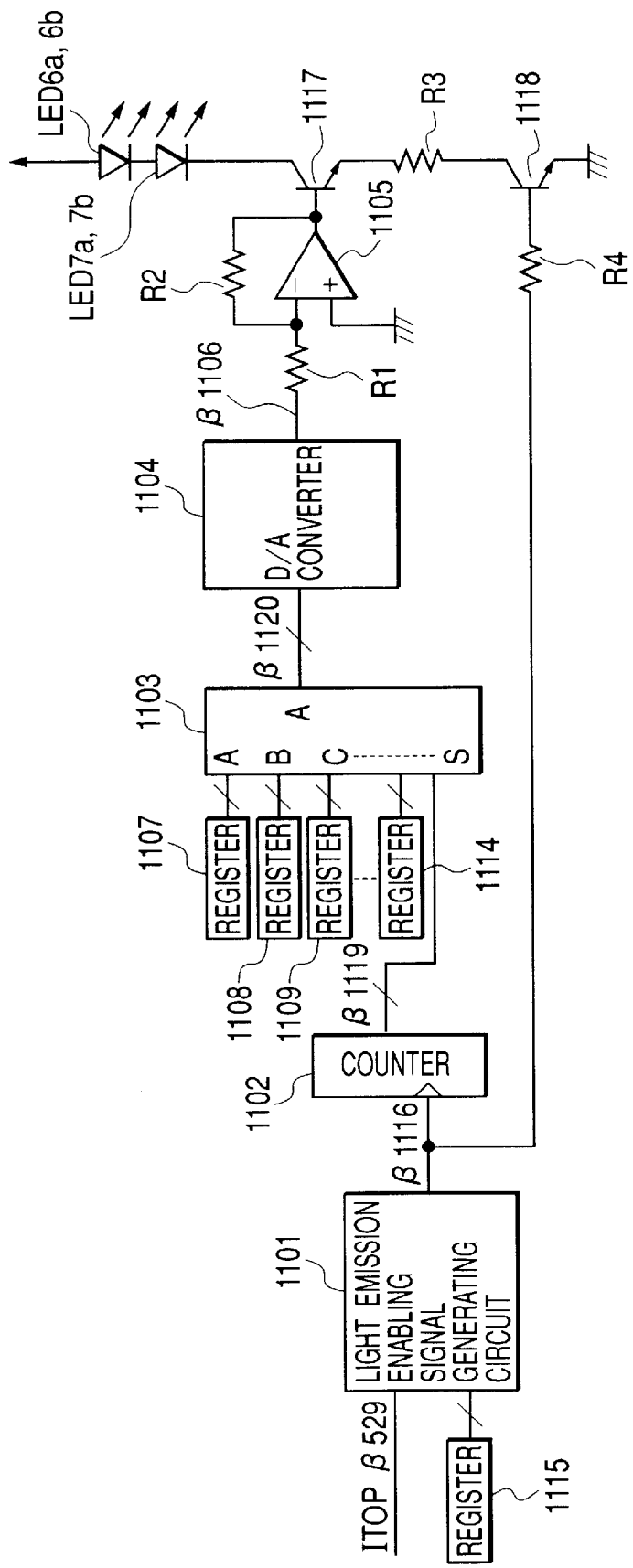
FIG. 12 is a block diagram illustrating an internal configuration of a light amount controller in the image forming apparatus of the present invention.

FIG. 12 is a block diagram illustrating an internal configuration of the light amount controller 403 in the image forming apparatus of the present invention. FIG. 13 is a timing chart illustrating operations of the light amount controller 403 of FIG. 12.

Figure 13:
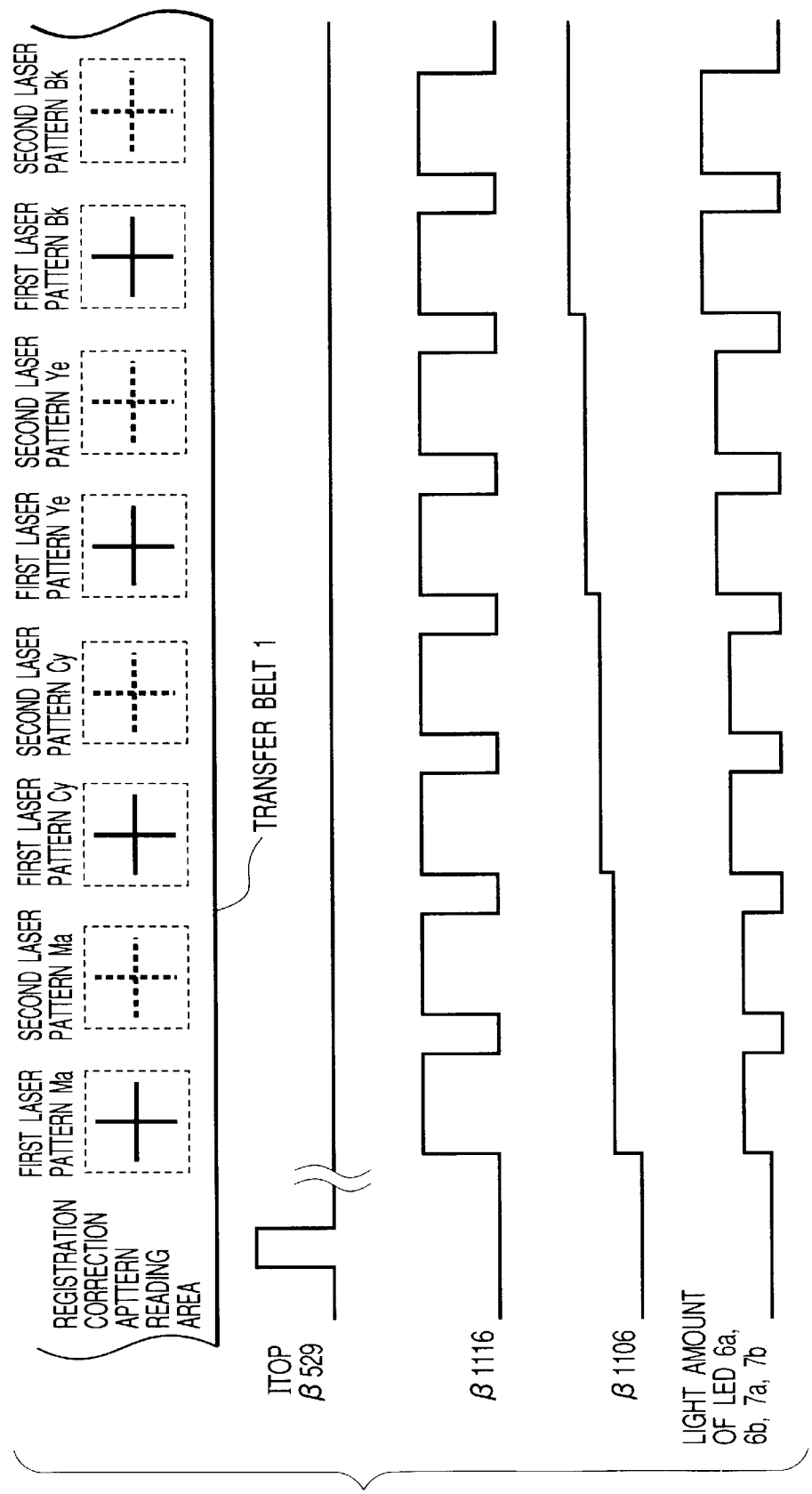
FIG. 13 is a timing chart illustrating operations of the light amount controller.

In FIG. 12, reference numeral 1101 denotes a light emission enabling signal generating circuit, which generates a light emission enabling signal β1116 for each registration correction pattern of each laser and each color at a timing set by a register 1115 on the basis of the ITOP β529 as shown in FIG. 13. The light emission enabling signal β1116 controls a transistor 1118 that turns on and off light emission of the LED 6a, 6b, 7a and 7b. At the same time, the light emission enabling signal β1116 is inputted in a counter 1102 and counted. Reference numerals R1, R2, R3 and R4 denote resistors.

Reference numerals 1107, 1108, 1109, . . . , 1114 are registers, in which predetermined values are set by the CPU 52c via the CPU bus β500. For example, data corresponding to each of an Ma pattern through a Bk pattern of the first and the second lasers is set in advance in the registers 1107 to 1114 of a selector 1103.

Reference numeral 1103 is a selector, from which light amount data β1120 corresponding to an output counter value β1119 from a light emission enabling counter 1102 is outputted.

In this embodiment, light amounts of the LED 6a, 6b, 7a and 7b are controlled for each color. "A0h" is set in the registers 1107 and 1108 corresponding to the first laser pattern Ma and the second laser pattern Ma, "B0h" is set in the registers 1109 and 1110 corresponding to the first laser pattern Cy and the second laser pattern Cy, "C0h" is set in the registers 1111 and 1112 corresponding to the first laser pattern Ye and the second laser pattern Ye, and "D0h" is set in the registers 1113 and 1114 corresponding to the first laser pattern Bk and the second laser pattern Bk. The light amount data β1120 is converted to an analog value β1106 by the D/A converter 1104, and is further reversely amplified by an amplifier 1105 to be inputted in a transistor 1117. As shown in FIG. 13, the light amounts of the LED 6a, 6b, 7a and 7b are controlled in accordance with each registration correction pattern.

Further, although light amounts of the LED 6a, 6b, 7a and 7b are changed for each color in this embodiment as described above, a light amount may be controlled for each laser and each pattern by varying to set values of the registers 1107 to 1114, respectively.

In addition, as shown in FIGS. 18A to 18D, since a detection level of K is extremely low compared with each color of Y, M and C, a light amount for K may be different from that for Y, M and C. In this case, control becomes easier.

Figure 14:
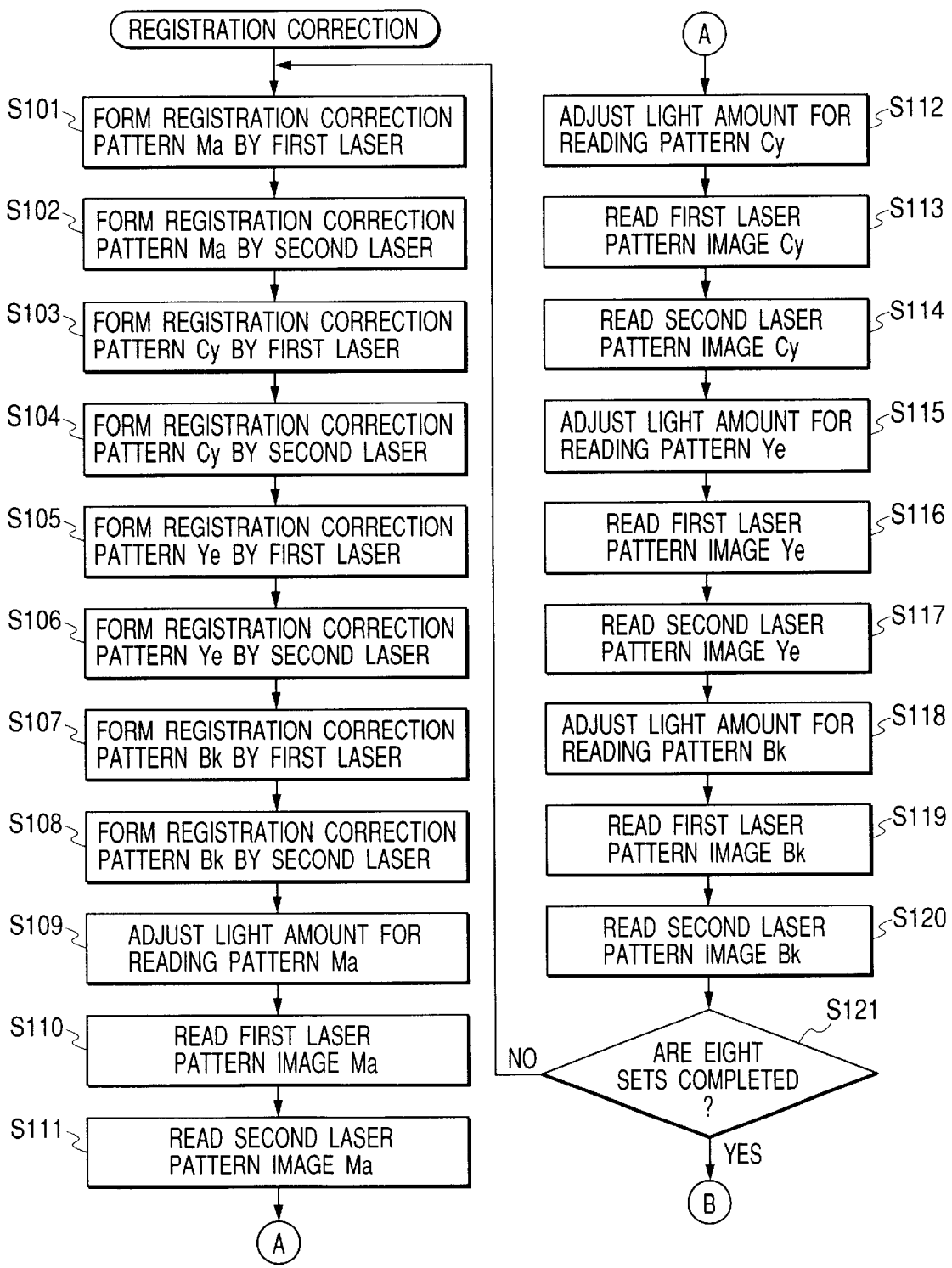
FIG. 14 is a flowchart describing an example of a registration correction sequence in the image forming apparatus of the present invention.
Figure 15:
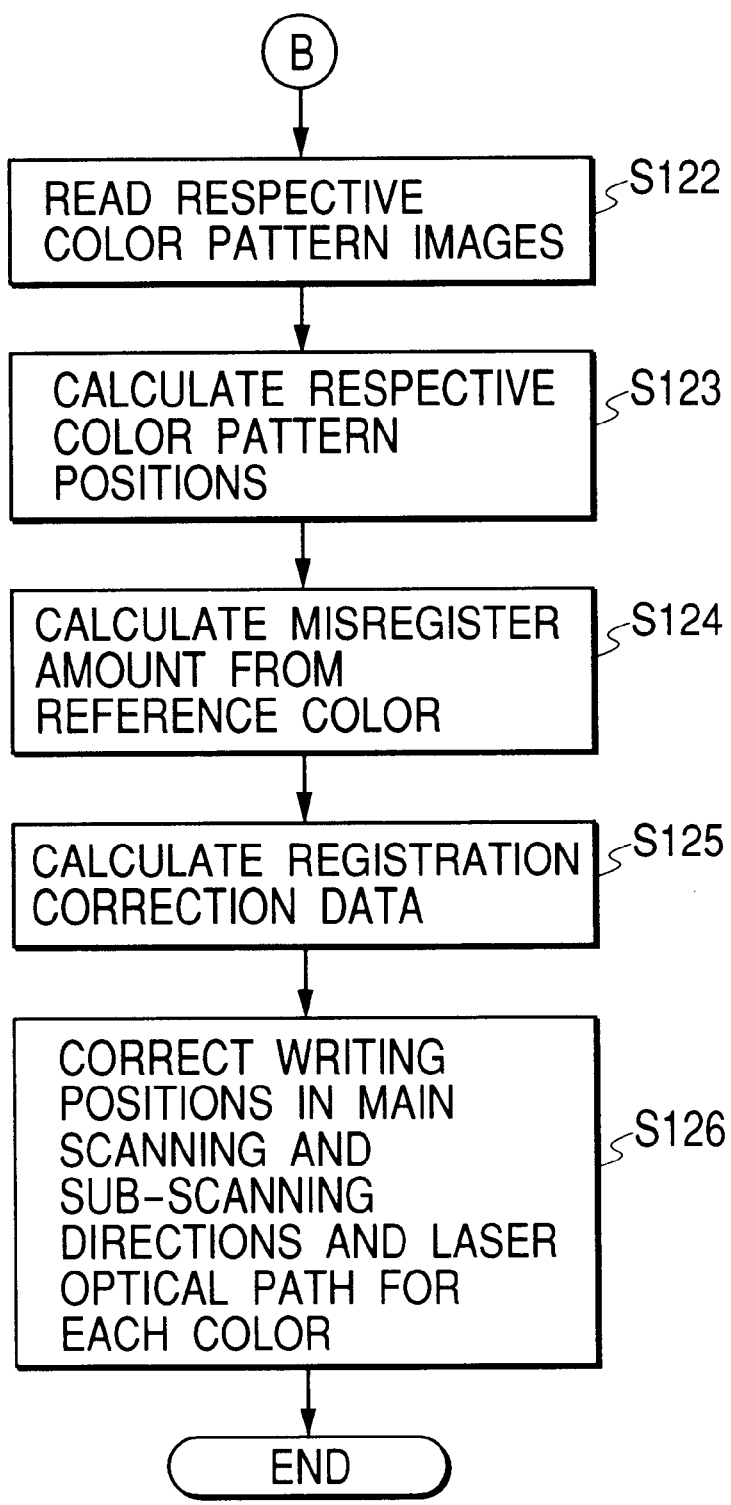
FIG. 15 is a flowchart describing the example of a registration correction sequence in the image forming apparatus of the present invention.

FIGS. 14 and 15 show a flowchart describing an example of a registration correction sequence in the image forming apparatus of the present invention. Further, reference numerals S101 to S126 denote each step. In addition, as described above, the image forming apparatus according to the present invention employs a configuration for forming an image using the two beam laser scan method. That is, the image forming apparatus has two laser beams for each color and is required to apply registration correction for each of them. A sequence of registration correction with respect to two types of laser scans for each color will be hereinafter described in accordance with the flowchart.

First, L1 is made active, L1' is put in a state, in which a laser beam is not irradiated strongly, such as OFF or bias lighting, and a registration correction pattern of magenta by a first laser is formed on a transfer belt (S101). Further, a pattern to be formed is the pattern shown in FIG. 6 described above.

Subsequently, contrary to step S101, L1' is made active, L1 is put in a state, in which a laser beam is not irradiated strongly, such as OFF or bias lighting, and a registration correction pattern of magenta by a second laser is formed on a transfer belt (S102). Patterns of cyan, yellow and black are thereafter formed on the transfer belt in the same manner as forming the pattern of magenta (S103 to S108).

The registration correction pattern of each color and each laser formed on the transfer belt is read next while histogram data is prepared as described above (S109 to S120).

More specifically, images are sequentially read from the registration correction patterns, which are transported starting from that for magenta, by the CCD sensors 10a and 10b. Before the registration correction pattern for magenta is transported, the light amount controller 403 described above adjusts light amounts of the LED 6a, 6b, 7a and 7b for the magenta registration correction pattern set in advance by the CPU 52c (S109).

Then, after a light amount becomes stable, when a first laser registration correction pattern of magenta is transported, reading of a pattern image is started. The pattern image is read while histogram data is prepared, and are stored in the RAMs 603 and 604 in the registration controller 20 (S110). A pattern image is read from a second laser registration correction pattern of magenta, which is transported next, by the same light amount (S111).

Then, since the completion of reading the second laser registration correction pattern of magenta until the start of reading a first laser registration correction pattern of cyan to be transported next, the light amount controller 403 adjusts light amounts of the LED 6a, 6b, 7a and 7b for a registration correction pattern of cyan set in advance by the CPU 52c (S112), and starts reading of the first and the second registration correction pattern images of cyan (S113, S114).

Thereafter, when registration correction patterns of yellow and black are read in the same manner, the patterns are read after controlling light amounts of the LED 6a, 6b, 7a and 7b for each color (S115 to S120).

In light amount adjustment as described above, it is preferable to increase a light amount of illuminating means more when a developer (colorant) of a color with a higher absorptance of light from the illuminating means is used. Since a registration correction pattern that is formed using a developer with a high absorptance of light has a less reflected light amount and transmitted light amount and accuracy of reading by the reading means is lowered, an irradiated light amount is increased to prevent this problem.

The above-mentioned formation and reading of a registration correction pattern are repeated eight times, and sixteen sets of registration correction patterns are formed and read in total, which consists of eight sets of registration correction patterns by the first laser and eight sets of registration correction pattern by the second laser (S121).

This is a measure for reducing correction mistakes or correction errors due to defective formation of a registration correction pattern on a belt and improving a level of registration correction by reading each registration correction pattern for a plurality of times.

Then, pattern image data for registration correction stored in the RAMs 603 and 604 in the registration controller 20 for two sets each of eight colors (8×2) is accessed and read by the CPU 52c (S122). A position of each pattern is derived by calculating a peak of histogram data of main scan/sub-scan of each color pattern as described above.

In addition, since eight sets of this pattern position data is read in order to increase validity of the data, a position data of a pattern is found by averaging the eight sets of data, respectively (S123). Here, each color pattern is read in a belt moving direction at a fixed interval that is a timing converted into a distance twice as large as a registration correction pattern. A pattern is also formed at a similar timing. Thus, deviation of a central position of histogram data of each color corresponds to a relative misregister amount of each color.

Subsequently, relative misregister amounts of the first laser and the second laser patterns of other colors with respect to a basic color of the first laser (a pattern of Cy in this embodiment) is calculated (S124).

In this embodiment, each color has a reading position accuracy of 256/256 steps in main scan/sub-scan, and one step has a resolution to 18 μm that is an accuracy of a registration correction pattern reading sensor (it is assumed that a belt moving direction is a sub-scan and a direction perpendicular to the belt moving direction is a main scan).

Here, for example, if data of Cy on the right side of the first laser with respect to the belt moving direction recognizes that a pattern is formed in a position 128/128 in main scan/sub-scan and data on the left side also recognizes that a pattern is formed in a position 128/128, and in this case, if the data of Ma on the right side of the first laser recognizes that a pattern is formed in a position 136/120 and data on the left side recognizes that a pattern is formed in a position 120/120, Ma of the first laser has a magnification in the main scanning direction that is sixteen steps (288 μm) ahead and an image writing position in the sub-scanning direction that is eight steps (144 μm) ahead of those of Cy of the first laser. In this way, registration correction data of the first and the second lasers of each color other than Cy of the first laser is calculated from misregister amounts of other colors compared with Cy of the first laser (S125).

If the above-mentioned example is applied, the registration correction data in this context is data for adjusting a writing position in the sub-scanning direction of the Ma of the first laser to delay the writing position 144 μm compared with Cy of the first laser, driving the pulse motor M1 for magnification correction of the reflecting mirror 1000Ma in the laser scanning optical system, and executing magnification adjustment corresponding to 288 μm (S126). In this embodiment, a pulse motor for skew correction is not driven because skew is not deviated. However, if skew is deviated, skew correction is executed in the same manner as magnification adjustment is executed.

In addition, since the first laser and the second laser of each color are irradiated on a photosensitive drum through a common optical system, magnification adjustment of the second laser is not necessary, for example, after magnification adjustment of Ma of the first laser is executed as in the above-mentioned example.

That is, after registration adjustment (optical path correction of skew/magnification adjustment and writing position correction) of other colors of the first laser with respect to Cy of the first laser is executed, only writing position adjustment is next executed as registration adjustment of Ma, Cy, Ye and Bk of the second laser with respect to Cy of the first laser.

In addition, although light amount adjustment of the LED 6a, 6b, 7a and 7b is performed for each color of a registration correction pattern in this embodiment, light amount adjustment may be performed for each laser in addition to that for each color. In this way, since a pattern image is read while light amount adjustment is performed independently for each registration correction pattern, more accurate pattern reading is possible.

According to this configuration, if the two beam laser scan method is used as in this embodiment, a difference such as a light amount dispersion among lasers can be adjusted such that the light amount dispersion does not affect the reading of a pattern. For example, it is sufficient to find a light amount difference among lasers in advance when a product is shipped, and to determine an illuminating light amount such that a difference of line widths at the time of pattern formation due to the light amount difference is canceled at the time of reading. Thus, a value that is found by further correcting an illumination value for each color by a laser dispersion correction value is used.

Further, although the examples in which the two beam laser scan method is used have been described in this embodiment, it is needless to mention that the present invention can be used in a one beam laser scan method as well.

According to the above-mentioned embodiment, a light amount of illumination irradiated on a registration correction mark when a correction mark is detected is independently set for each registration correction mark of each image station in order to keep constant a detection level of each registration correction mark formed by each image forming station. Thus, an S/N ratio and a detection level of a registration correction mark of a colorant with a small light reflectance and a low detection level are improved. As a result, an adjustment with high accuracy can be executed when an electrical correction is applied to an image signal to be recorded and/or when an optical length is changed or a change in an optical length is corrected by driving a reflecting mirror provided in an optical path of a laser beam according to a registration deviation amount obtained by detecting a registration correction mark recorded by each image station.

A configuration of a data processing program that can be read by an image forming system to which the image forming apparatus in accordance with the present invention is applicable will be hereinafter described with reference to a memory map shown in FIG. 16.

FIG. 16 illustrates a memory map of a storage medium storing various data processing programs that can be read by an image forming system to which the image forming apparatus in accordance with the present invention is applicable.

Further, although not specifically illustrated, information for managing a group of programs to be stored in the storage medium, for example version information, a creator and the like may be stored. In addition, information dependent on an OS or the like on a program reading side such as an icon for identifying to display a program may also be stored.

Moreover, data subordinate to various programs are also managed in the above-mentioned directory. In addition, a program for installing various programs in a computer, a program for uncompressing a program for installing various programs if the program is compressed, or the like may be stored.

The functions shown in FIGS. 14 and 15 in this embodiment may be executed by a host computer using a program installed from outside. In this case, the present invention is applied to a case in which a group of information including programs is supplied to an output apparatus by a storage medium such as a CD-ROM, a flash memory and an FD or from an external storage medium via a network.

As described above, a storage medium having a program code of software for realizing the above-mentioned functions of this embodiment recorded thereon is supplied to a system or an apparatus, and a computer (or, a CPU or an MPU) of the system or the apparatus reads out and executes the program code stored in the storage medium. It is needless to mention that the object of the present invention can be attained in this way as well.

In this case, the program code itself read out from the storage medium realizes the new functions of the present invention, and the storage medium having the program code stored thereon constitutes the present invention.

As a storage medium for supplying a program code, for example, a floppy disk, a hard disk, an optical disk, a magneto-optical disk, a CD-ROM, a CD-R, a magnetic tape, a nonvolatile memory card, a ROM, an EEPROM or the like can be used.

The above-mentioned functions of this embodiment are realized by executing the program code read out by the computer as described above. In addition to this, it is needless to mention that the present invention includes a case in which an OS (operating system) or the like running on the computer based on instructions of the program code performs a part of or an entire actual processing and the above-mentioned functions of this embodiment are realized by the processing.

Moreover, it is needless to mention that the present invention also includes a case in which, after the program code read out from the storage medium is written in a memory provided in a function extending board inserted in the computer or a function extending unit connected to the computer, a CPU or the like provided in the function extending board or the function extending unit performs a part of or an entire actual processing based on instructions of the program code, and the above-mentioned functions of this embodiment is realized by the processing.

<Another Embodiment>

Figure 17:
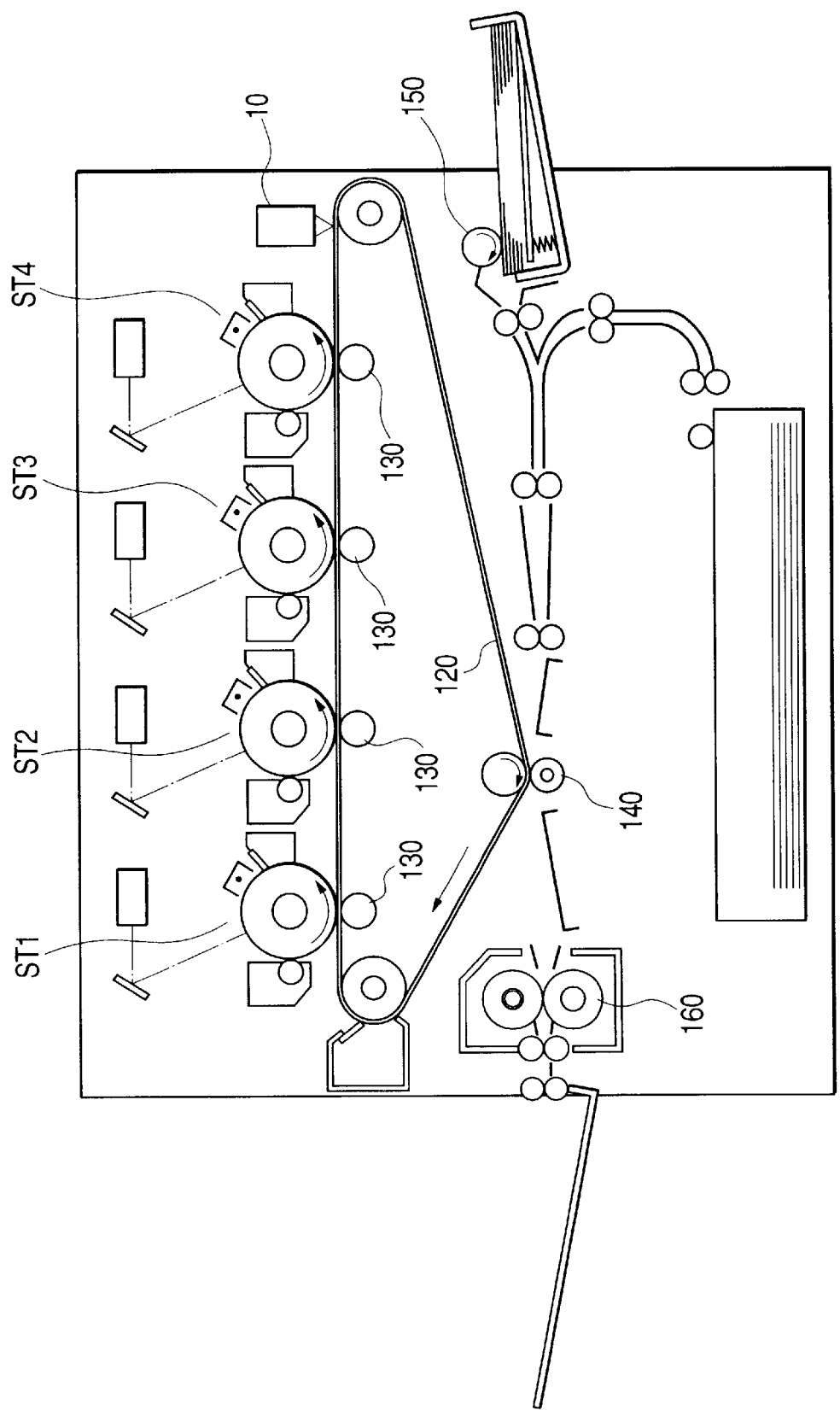
FIG. 17 is an image forming apparatus of another aspect of the present invention.

The applications of the present invention in the image forming apparatus for forming an image on a transferring material borne and transported by a transfer belt have been described in the above-mentioned embodiment. However, the present invention can be applied to an image forming apparatus using an intermediate transfer member as shown in FIG. 17. This embodiment has a configuration similar to that of the above-mentioned embodiment except that a registration correction mark is formed on the intermediate transfer member.

This image forming apparatus will be described with reference to FIG. 17. Images formed by a plurality of image forming means ST1 to ST4 are sequentially superimposed to be transferred on an intermediate transfer belt 120 being the intermediate transfer member (transporting member) by each transferring means 130. Then, the images are collectively transferred on the transferring material fed by feed means 150 by secondary transferring means 140, and the transferring material on which the images are transferred is fixed by fixing means 160, thereby image forming operations are performed. Then, in order to register the plurality of image forming means ST1 to ST4 each other, a registration correction mark is formed on the intermediate transfer belt 120, this registration correction mark is read by the reading means 10, and the registration correcting operations shown in the above-mentioned embodiment are performed in each image forming means. Then, when the registration correction mark is read, a detection level of the registration correction mark can be made stable and an accuracy of registration correcting operations can be increased by changing an illumination light amount for reading according to a color of the registration correction mark.

Further, reading means for reading a registration correction mark is described regarding a method of detecting reflected light that is light emitted by illuminating means reflected from the registration correction mark. However, the present invention can also be applied to a configuration in which at least a part where a registration correction mark on a transferring material transporting member or an intermediate transfer member is formed is substantially transparent, and transmitted light that is light emitted by the illuminating means transmitted through the registration correction mark is detected.

As many apparently widely different embodiments of the present invention can be made without departing from the spirit and scope thereof, it is to be understood that the invention is not limited to the specific embodiments thereof except as defined in the appended claims.

What is claimed is:

1. An image forming apparatus comprising:
   a plurality of image forming means for forming images with different colors, respectively;
   transporting means for bearing and transporting a transferring material;
   transferring means for sequentially transferring an image formed by each image forming means, to the transferring material;
   mark forming means for controlling each of said image forming means in order to form a misregister detection mark and controlling said transferring means in order to transfer said misregister detection mark to said transporting means;
   detecting means for optically detecting said misregister detection mark on said transferring means;
   correcting means for correcting a misregister based on information from said detecting means; and
   adjusting means for variably adjusting a detection condition of said detecting means, based on a color of said misregister detection mark to be detected.

2. An image forming apparatus according to claim 1, wherein said detecting means comprises illuminating means for illuminating said misregister detection mark on said transferring means, and reading means for reading said misregister detection mark illuminated by said illuminating means,
   wherein said adjusting means variably adjusts a light amount of said illuminating means, based on a color of said misregister detection mark to be read.

3. An image forming apparatus according to claim 2, wherein said adjusting means increases a light amount of said illuminating means as an absorptance of light from said illuminating means of a colorant forming said misregister detection mark becomes higher.

4. An image forming apparatus according to claim 2, wherein a plurality of misregister detection marks is formed, at least one for each of said plurality of image forming means, and said adjusting means can adjust a light amount independently for each of said plurality of misregister detection marks.

5. An image forming apparatus according to claim 2, wherein a series of operations including an operation for forming said misregister detection mark by said mark forming means, an illuminating operation performed by said illuminating means and a reading operation performed by said reading means is repeated a plurality of times.

6. An image forming apparatus according to claim 2, wherein said adjusting means varies a light amount of said illuminating means between a time when a misregister detection mark formed by a predetermined image forming means is illuminated and a time when a misregister detection mark formed by image forming means other than said predetermined image forming means is illuminated.

7. An image forming apparatus according to claim 6, wherein said predetermined image forming means forms an image using a colorant that absorbs light from said illuminating means most among said plurality of image forming means.

8. An image forming apparatus according to claim 2, wherein said reading means receives a light from said illuminating means reflected by said misregister detection mark.

9. An image forming apparatus according to claim 2, wherein said reading means receives a light from said illuminating means transmitted through said misregister detection mark.

10. An image forming apparatus comprising:
    a plurality of image forming means for forming images with different colors, respectively;
    transferring means for sequentially transferring an image formed by each image forming means, to an intermediate transfer member;
    mark forming means for controlling each of said image forming means in order to form a misregister detection mark;
    detecting means for detecting said misregister detection mark on said intermediate transfer member;
    correcting means for correcting a misregister based on information from said detecting means; and
    adjusting means for variably adjusting a detection condition of said detecting means, based on a color of said misregister detection mark to be detected.

11. An image forming apparatus according to claim 10, wherein said detecting means comprises illuminating means for illuminating said misregister detection mark on said intermediate transfer member, and reading means for reading said misregister detection mark illuminated by said illuminating means,
    wherein said adjusting means variably adjusts a light amount of said illuminating means, based on a color of said misregister detection mark to be read.

12. An image forming apparatus according to claim 11, wherein said adjusting means increases a light amount of said illuminating means as an absorptance of light from said illuminating means of a colorant forming said misregister detection mark becomes higher.

13. An image forming apparatus according to claim 11, wherein a plurality of misregister detection marks is formed, at least one for each of said plurality of image forming means, and said adjusting means can adjust a light amount independently for each of said plurality of misregister detection marks.

14. An image forming apparatus according to claim 11, wherein a series of operations including an operation for forming said misregister detection mark by said mark forming means, an illuminating operation performed by said illuminating means and a reading operation performed by said reading means is repeated a plurality of times.

15. An image forming apparatus according to claim 11, wherein said adjusting means varies a light amount of said illuminating means between a time when a misregister detection mark formed by a predetermined image forming means is illuminated and a time when a misregister detection mark formed by image forming means other than said predetermined image forming means is illuminated.

16. An image forming apparatus according to claim 15, wherein said predetermined image forming means forms an image using a colorant that absorbs light from said illuminating means most among said plurality of image forming means.

17. An image forming apparatus according to claim 11, wherein said reading means receives a light from said illuminating means reflected by said misregister detection mark.

18. An image forming apparatus according to claim 11, wherein said reading means receives a light from said illuminating means transmitted through said misregister detection mark.

19. A method of correcting a registration among a plurality of image forming means in an image forming apparatus, which sequentially superimposes images formed by the plurality of image forming means to form an image, said method comprising:

a mark forming step for controlling the plurality of image forming means in order to form a misregister detection mark;

a detecting step for detecting the misregister detection mark formed by each of the plurality of image forming means;

a correcting step for correcting a misregister based on information obtained in said detecting step; and an adjusting step for variably adjusting a detection condition of the detecting step, based on a color of the misregister detection mark to be detected.

20. A method to claim 19, wherein said detecting step comprises an illuminating step for illuminating with illuminating means the misregister detection mark formed by each of the plurality of image forming means, and a reading step for reading the misregister detection mark illuminated by said illuminating step, wherein said adjusting step variably adjusts a light amount of the illuminating means, based on a color of the misregister detection mark to be read.

21. A method according to claim 20, wherein said adjusting step comprises increasing a light amount of the illuminating means as an absorptance of light from the illuminating means of a colorant forming the misregister detection mark becomes higher.

22. A method according to claim 20, wherein a plurality of misregister detection marks is formed, at least one for each of the plurality of image forming means, and said adjusting step comprises adjusting independently a light amount for each of the plurality of misregister detection marks.

23. A method according to claim 20, wherein said mark forming step, said illuminating step and said reading step are made into a series of steps, and said series of steps is repeated a plurality of times.

24. A method according to claim 20, wherein said adjusting step comprises varying a light amount of the illuminating means between a time when a misregister detection mark formed by a predetermined image forming means is illuminated and a time when a misregister detection mark formed by image forming means other than the predetermined image forming means is illuminated.

25. A method according to claim 24, wherein the predetermined image forming means forms an image using a colorant that absorbs light from the illuminating means most among the plurality of image forming means.

* * * * *

UNITED STATES PATENT AND TRADEMARK OFFICE
CERTIFICATE OF CORRECTION

PATENT NO. : 6,614,506 B2
DATED : September 2, 2003
INVENTOR(S) : Hirokazu Kodama et al.

It is certified that error appears in the above-identified patent and that said Letters Patent is hereby corrected as shown below:

<u>Title page,</u>
Item [57], ABSTRACT,
Line 1, "apparatus for sequentially" should read -- apparatus that sequentially --.

<u>Drawings,</u>
Sheet 11 of 18, FIG. 11, "POSTION" should read -- POSITION --.
Sheet 13 of 18, FIG. 13, "APTTERN READING AREA" should read -- PATTERN READING AREA --.
Sheet 16 of 18, FIG. 16, "FIRST DATA PROCESSING PROGRAM CODE" should read -- FIRST DATA PROCESSING PROGRAM CODE --.

<u>Column 3,</u>
Line 15, "of" should be deleted.

<u>Column 5,</u>
Line 16, "100Ma," should read -- 1000Ma, --.
Line 17, "100Cy," should read -- 1000Cy, --.

<u>Column 7,</u>
Line 32, "β522$a$" should read -- β523$a$ --.
Line 33, "β522$b$" should read -- β523$b$ --.
Line 50, "an" should read -- a --.

<u>Column 8,</u>
Line 1, "genera ting" should read -- generating --.
Line 47, "100Ma," should read -- 1000Ma, --.
Line 48, "100Cy," should read -- 1000Cy, --.
Line 55, "100Cy," should read -- 1000Cy, --.

<u>Column 10,</u>
Line 7, "be" should be deleted.

UNITED STATES PATENT AND TRADEMARK OFFICE
CERTIFICATE OF CORRECTION

PATENT NO. : 6,614,506 B2
DATED : September 2, 2003
INVENTOR(S) : Hirokazu Kodama et al.

It is certified that error appears in the above-identified patent and that said Letters Patent is hereby corrected as shown below:

Column 12,
Line 8, "pattern" should read -- patterns --.

Column 15,
Line 10, "each" should read -- to each --.

Signed and Sealed this

Fifteenth Day of June, 2004

JON W. DUDAS
*Acting Director of the United States Patent and Trademark Office*